(12) United States Patent
Culpepper et al.

(10) Patent No.: US 10,612,245 B2
(45) Date of Patent: Apr. 7, 2020

(54) SIDING PANEL AND ASSEMBLY

(71) Applicant: Progressive Foam Technologies, Inc., Beach City, OH (US)

(72) Inventors: Patrick M. Culpepper, Canton, OH (US); Ryan Beach, New Philadelphia, OH (US)

(73) Assignee: PROGRESSIVE FOAM TECHNOLOGIES, INC., Beach City, OH (US)

( * ) Notice: Subject to any disclaimer, the term of this patent is extended or adjusted under 35 U.S.C. 154(b) by 128 days.

(21) Appl. No.: 15/874,034

(22) Filed: Jan. 18, 2018

(65) Prior Publication Data

US 2018/0202167 A1 Jul. 19, 2018

Related U.S. Application Data

(60) Provisional application No. 62/529,110, filed on Jul. 6, 2017, provisional application No. 62/447,548, filed on Jan. 18, 2017.

(51) Int. Cl.
*E04F 13/075* (2006.01)
*E04F 13/077* (2006.01)
*E04F 13/08* (2006.01)
*C09J 7/30* (2018.01)
(Continued)

(52) U.S. Cl.
CPC .............. *E04F 13/075* (2013.01); *B32B 7/12* (2013.01); *C09J 7/245* (2018.01); *C09J 7/30* (2018.01); *E04F 13/077* (2013.01); *E04F 13/0866* (2013.01); *E04F 13/0876* (2013.01); *C09J 2203/30* (2013.01); *C09J 2433/00* (2013.01);
(Continued)

(58) Field of Classification Search
CPC . E04F 13/075; E04F 13/0866; E04F 13/0876; E04F 13/077; E04F 2201/023; E04F 2201/0107; E04F 13/0864; B32B 7/12; C09J 7/30; C09J 7/245; C09J 2203/30; C09J 2433/00
See application file for complete search history.

(56) References Cited

U.S. PATENT DOCUMENTS 3,159,943 A * 12/1964 Sugar .................. E04F 13/0864
52/278
3,468,086 A * 9/1969 Warner .................. E04D 3/355
52/173.1

(Continued)

*Primary Examiner* — Babajide A Demuren
(74) *Attorney, Agent, or Firm* — Fay Sharpe LLP

(57) ABSTRACT

A composite siding panel mountable on an exterior wall of a building includes a backing member and a siding member attached to the backing member, wherein the first side edge of the siding member overhangs the first side edge of the backing member, and the second side edge of the siding member also overhangs the second front side edge of the backing member. An adhesive coating joins the front face of the backing member to the rear face of the siding member. The adhesive coating runs substantially from the first side edge of the backing member to the second side edge thereof. In the field, the overhang on one side can be trimmed or removed as desired to make a siding assembly with the overhangs organized as desired for aesthetic purposes. A siding assembly including a plurality of composite siding panels adjacently mountable on an exterior wall of a building is also disclosed.

20 Claims, 24 Drawing Sheets

(51) Int. Cl.
*C09J 7/24* (2018.01)
*B32B 7/12* (2006.01)

(52) U.S. Cl.
CPC ... *E04F 13/0864* (2013.01); *E04F 2201/0107* (2013.01); *E04F 2201/023* (2013.01)

(56) References Cited

U.S. PATENT DOCUMENTS

| | | | | |
|---|---|---|---|---|
| 5,869,176 | A * | 2/1999 | Dorchester | B29C 48/175 428/327 |
| 6,029,415 | A * | 2/2000 | Culpepper | E04F 13/0864 52/522 |
| 6,050,041 | A * | 4/2000 | Mowery | E04F 13/18 52/506.05 |
| 6,195,952 | B1 * | 3/2001 | Culpepper | E04F 13/0864 52/522 |
| 8,091,313 | B2 * | 1/2012 | Wilson | E04F 13/007 52/302.1 |
| 8,381,472 | B1 * | 2/2013 | Fleenor | E04F 13/0825 52/459 |
| 2002/0029537 | A1 * | 3/2002 | Manning | E04F 13/0864 52/518 |
| 2005/0081468 | A1 * | 4/2005 | Wilson | E04F 13/007 52/528 |
| 2010/0132289 | A1 * | 6/2010 | Mahaffey | E04F 13/0864 52/309.8 |
| 2011/0197530 | A1 * | 8/2011 | Bahnmiller | B32B 5/14 52/309.4 |
| 2016/0208498 | A1 * | 7/2016 | Martin | E04F 13/0864 |

* cited by examiner

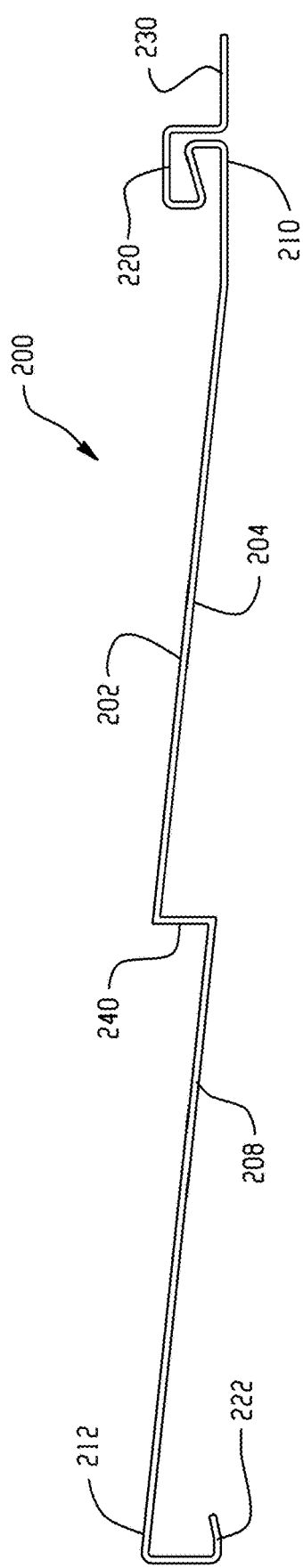
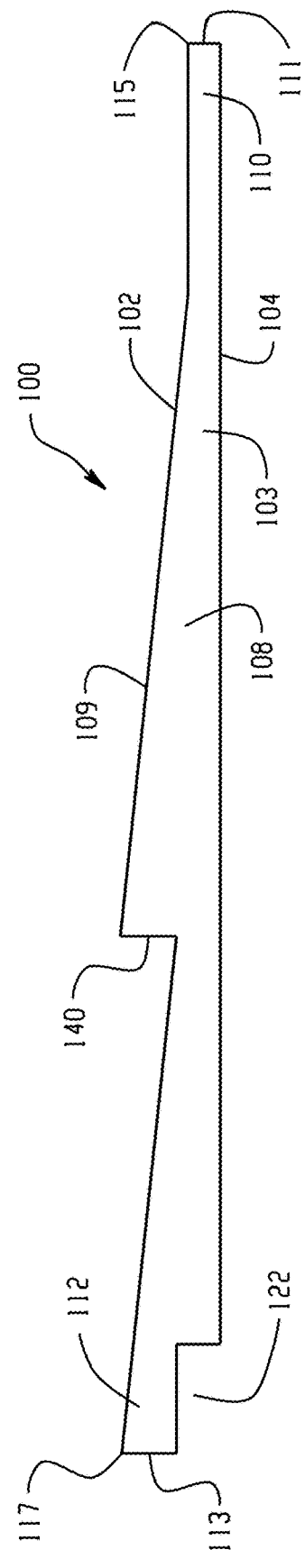
Fig. 3A
Fig. 3B

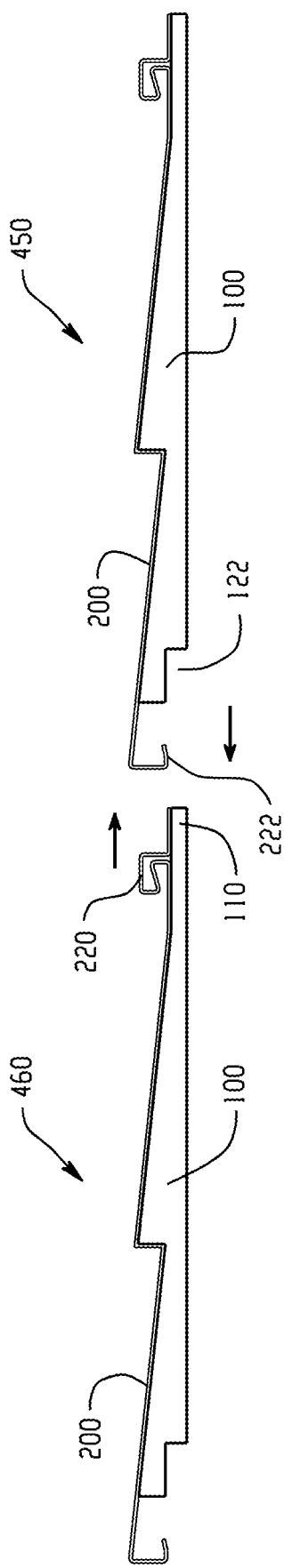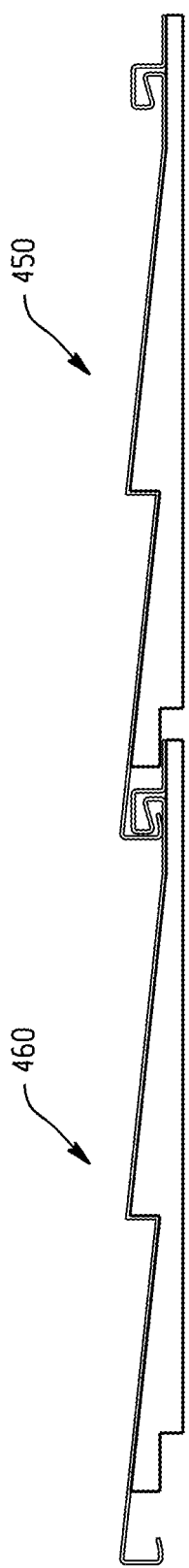

SIDING PANEL AND ASSEMBLY

CROSS-REFERENCE TO RELATED APPLICATIONS

This application claims priority to U.S. Provisional Patent Application Ser. No. 62/529,110, filed on Jul. 6, 2017, and to U.S. Provisional Patent Application Ser. No. 62/447,548, filed Jan. 18, 2017, the entireties of which are hereby fully incorporated by reference herein.

BACKGROUND

The present disclosure relates to a composite siding panel for an exterior wall of a building such as a house. Methods and processes for making and/or using such siding panels are also disclosed. In particular, the present disclosure provides for a siding panel including a siding member attached to a foam backing member. The front of the foam backing member includes an adhesive. The side edges of the siding member and the backing member are positioned relative to each other so as to eliminate the adhesive gap present in prior composite siding panels. Elimination of the adhesive gap eliminates undesirable buckling and stretching that can occur in such siding systems due to sun exposure, and simplifies the installation process.

Composite siding panels are known in the art. Vinyl siding is a popular choice because it is easily cleaned and it is resistant to deterioration. It may also be easily installed around windows and doors. Moreover, it may be produced in a variety of shapes and colors by known extrusion and molding processes at a relatively low cost per sheet or panel.

In many traditional composite siding panels, a vinyl siding member is attached to a foam backing member. Adhesive is applied to the front of the foam backing member for securing the backing member to the siding member. However, the adhesive usually terminates two to three inches from the vertical edges of the siding member. With such siding systems, an adhesive gap (i.e., a zone of no adhesive) of about five to six inches results between the backing members of adjacent siding panels.

The presence of such an adhesive gap can cause some problems. First, vinyl siding members have high coefficients of expansion and contraction, especially when exposed to heat such as from sun exposure. This can cause buckling and stretching of the vinyl siding member in the adhesive gap, resulting in an unacceptable, uneven, unsightly exterior surface. This may be known as "fish mouth", and can be caused by excessive heat, resulting in the vinyl warping away from flat when post-formed. Another condition known as "dimpling" is a visual defect that is most visible when the vinyl siding is a dark color. In addition, the vertical edges of adjacent vinyl siding members often do not lay flat, due to sun exposure or improper manufacturing, handling, or installation. This can permit water, dirt, and debris, as well as air infiltration, through the siding and against the exterior wall that is supposed to be protected by the siding. It would be desirable to provide composite siding panels that allow for simple production and easy installation without the disadvantages of prior siding systems, such as the presence of adhesive gaps.

BRIEF DESCRIPTION

Disclosed in various embodiments herein are bi-directional composite siding panels comprising a backing member and a siding member. The backing member has a front face, a rear face opposite the front face thereof, and longitudinally-extending first and second side faces. Rear side edges are present at the intersection of the rear face with each side face, and front side edges are present at the intersection of the front face with each side face. The siding member has a front face, a rear face opposite the front face thereof, and longitudinally-extending first and second side edges. The rear face of the siding member is in overlying relationship with and attached to the front face of the backing member via an adhesive coating. The adhesive coating is located between the siding member and the backing member, and runs substantially from the first front side edge of the backing member to the second front side edge thereof. The first side edge of the siding member extends outwardly beyond the first front side edge/first side face of the backing member to create a first overhang, and the second side edge of the siding member extends outwardly beyond the second front side edge/second side face of the backing member to create a second overhang.

In some particular additional embodiments, an adhesive layer can be present on a rear surface of the first or second overhang. The adhesive layer can comprise an acrylic adhesive. The adhesive may be pre-applied to the rear surface, or can be provided as part of a kit as a double-sided adhesive tape. It has been found that a tape with a foam core, rather than a sheet core, is most effective.

The siding member can overhang the backing member by 0.375 inches or more, or in other words the overhangs can have a width of 0.375 inches or more. In particular embodiments, the overhangs are from 0.375 inches to about 1.25 inches.

The siding member can include a nailing hem proximate a top end thereof. The nailing hem has a plurality of apertures therein for securing the composite siding panel to an exterior wall of a building. In particular embodiments, the nailing hem is set back from both the first side edge and the second side edge of the siding member. As a result, a "cutout" or gap is present between the nailing hem and both sides of the siding member. The cutout can range in size from about 1.0 inches to about 3.0 inches. Alternatively described, the top edge of the siding member (i.e. the nailing hem) is shorter in width than the bottom edge/face of the siding member.

The adhesive coating can also run substantially vertically in the overlapping portion of the backing member and the siding member, i.e. from a top edge of the siding member to a bottom front edge of the backing member.

In particular embodiments, the adhesive coating is discontinuous and is in the form of one or more beads, ribbons, dots, or swirls. In other embodiments, the adhesive coating is continuous and substantially covers the front face of the backing member from the first front side edge to the second front side edge of the backing member and from a top front edge to a bottom front edge of the backing member. Where complete coverage of the front face of the backing member is desired, the adhesive can be applied by, for example, a roll coater or a curtain coater.

The rear face of the backing member should be substantially planar, so that the composite siding panel is mountable on the exterior wall of a building. The first and second side faces of the backing member may also be substantially planar, and may be substantially parallel to each other. The rear face of the backing member can include drainage grooves which are operable to remove water from a surface of the exterior wall.

In certain embodiments, the backing member is shape-molded and composed of closed-cell expanded foam. In other embodiments, the backing member is formed from wire-fabricated foam. The siding member may be formed from vinyl, polypropylene, aluminum, steel, fiberglass, engineered wood, or fiber cement.

The backing member may have one or more contours defined therein and the siding member may have one or more complementary contours defined therein.

A bottom face of the siding member can include one or more drainage holes therein. A top end of the backing member can extend upwardly beyond a top end of the siding member. The backing member can include a laterally-extending relief channel in the rear face thereof proximate a bottom end thereof. The relief channel can run from the first rear side edge to the second rear side edge of the backing member. The relief channel is shaped to fit the top end of the backing member. Put another way, the relief channel is configured to engage the top end of a longitudinally adjacent backing member.

In certain embodiments, the siding member includes a locking flange proximate a top end thereof and a locking lip proximate a bottom end thereof. The locking flange may be complementary in shape to the locking lip and may be configured to operably engage with the locking lip of a longitudinally adjacent siding member. The locking flange may run from the first side face of the siding member to short of the second side face thereof, similar to the nailing hem.

Also disclosed herein are siding assemblies comprising including a plurality of composite siding panels as described above. Also disclosed are kits that include a composite siding panel as described above, as well as a double-sided tape. The double-sided tape comprises a foam core with two opposing surfaces; and an adhesive layer on each of the two opposing surfaces. It has been found that a tape with a foam core works better than a tape with a sheet core. Also disclosed are methods of using the bi-directional composite siding panels disclosed herein.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 3A is a side view of a siding member according to the present disclosure. The siding member includes contours that are complementary to the contours of the backing member. FIG. 3B is a side view of a backing member according to the present disclosure. The backing member includes contours that are complementary to the contours of the siding member.

FIG. 8A is a side view of a siding assembly comprising two composite siding panels placed laterally adjacent one another. The arrows indicate the direction that each siding panel moves in order to operably engage with the other siding panel. FIG. 8B is another side view of the siding assembly of FIG. 8A with the two composite siding panels engaging one another. In particular, a locking flange of the siding member of the lower siding panel operably engages with a locking lip of the siding member of the upper siding panel, and the top end of the backing member of the lower siding panel extends upwardly into the relief channel in the backing member of the upper siding panel.

In FIG. 18A, the acrylic adhesive is visible as a double-sided tape with a release liner still applied. In FIG. 18B, the release liner is being peeled off. In FIG. 18C, the acrylic adhesive/tape is visible. In FIG. 18D, the second siding panel is being applied upon the acrylic adhesive/tape. In FIG. 18E, the two siding panels are joined together. The acrylic adhesive/tape is not visible.

FIG. 19A shows the piece of wood on the left, and the foam with an acrylic adhesive strip in the form of a double-sided tape with a release liner still applied. FIG. 19B shows the release liner fully removed from the acrylic adhesive strip. FIG. 19C shows the wood adhered to the foam via the acrylic adhesive.

FIG. 20A shows the fiber cement on the right and the foam on the left with two strips of acrylic adhesive in the form of a double-sided tape with a release liner still applied. FIG. 20B shows the release liner fully removed from one strip and in the process of being removed from the second strip. FIG. 20C shows the two strips of acrylic adhesive. FIG. 20D shows the fiber cement adhered to the foam via the acrylic adhesive.

DETAILED DESCRIPTION

Figure 1:
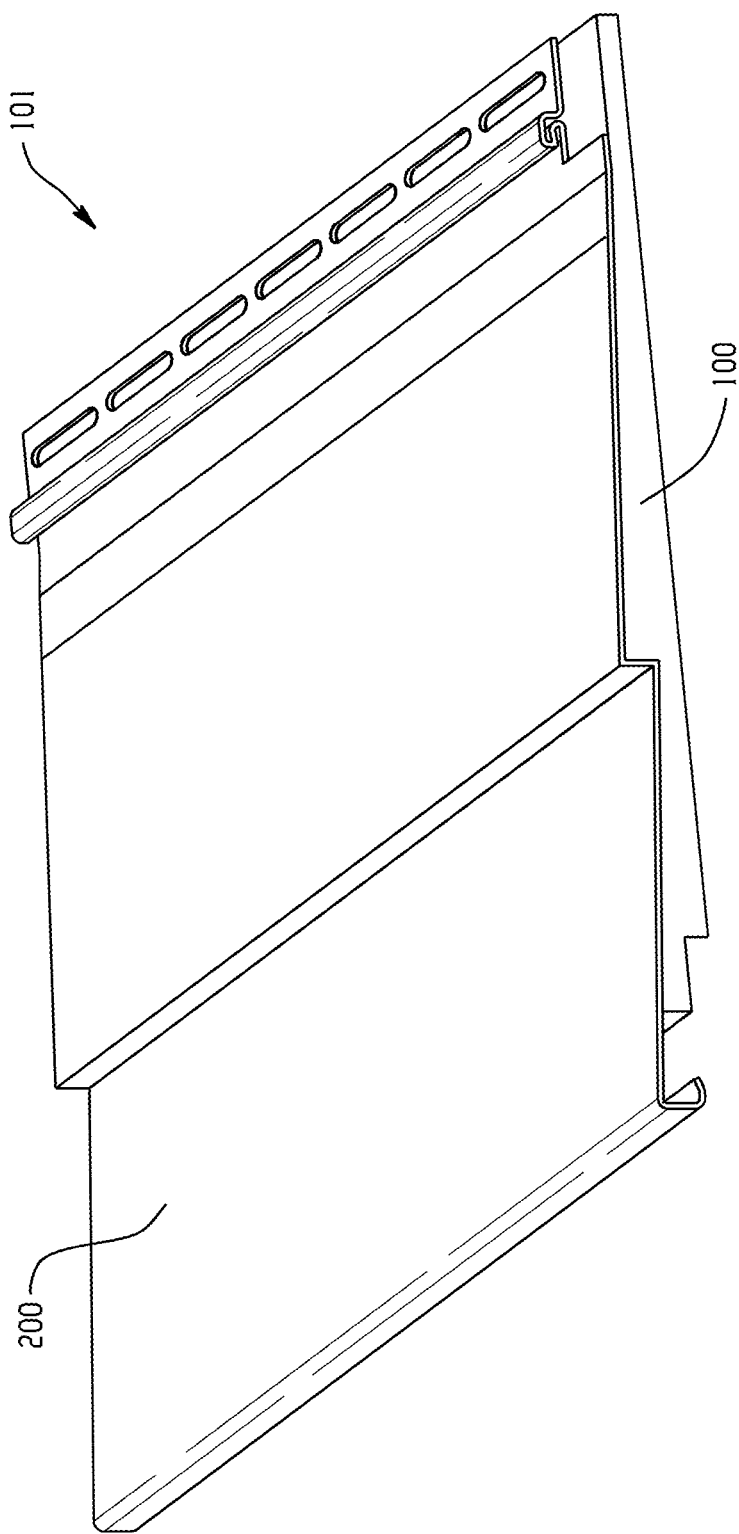
FIG. 1 is a right side perspective view of a composite siding panel according to the present disclosure. The composite siding panel includes a siding member and a backing member. The overhang is on the far side of the panel.

A more complete understanding of the components, panels, assemblies, and processes disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments. In the drawings and the following description below, it is to be understood that like numeric designations refer to components of like function.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

The term "comprising" is used herein as requiring the presence of the named components/steps and allowing the presence of other components/steps. The term "comprising" should be construed to include the term "consisting of", which allows the presence of only the named components/steps, along with any impurities that might result from the manufacture of the named components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "substantially" and "about" can be used to include any numerical value that can vary without changing the basic function of that value. When used with a range, "substantially" and "about" also disclose the range defined by the absolute values of the two endpoints, e.g. "about 2 to about 4" also discloses the range "from 2 to 4." The terms "substantially" and "about" may refer to plus or minus 10% of the indicated number. It is noted that when the term "substantially" is used in the context of describing the location of adhesive relative to edges of the backing member or the siding member, this term refers to +/− three-sixteenths of an inch (3/16 inch).

The present disclosure refers to components as having a length, width, height, and thickness. It is noted that "length" and "width" are used interchangeably herein, or put another way, these terms refer to the same dimension or axis.

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "horizontal" and "vertical" are used to indicate direction relative to an absolute reference, i.e. ground level. The terms "above" and "below", or "upwards" and "downwards" are also relative to an absolute reference; an upwards flow is always against the gravity of the earth.

The term "parallel" should be construed in its lay term as two edges or faces generally continuously having the same distance between them, and should not be strictly construed in mathematical terms as requiring that the two edges or faces cannot intersect when extended for an infinite distance. Similarly, the term "planar" should not be strictly construed as requiring that a given surface be perfectly flat.

Figure 15:
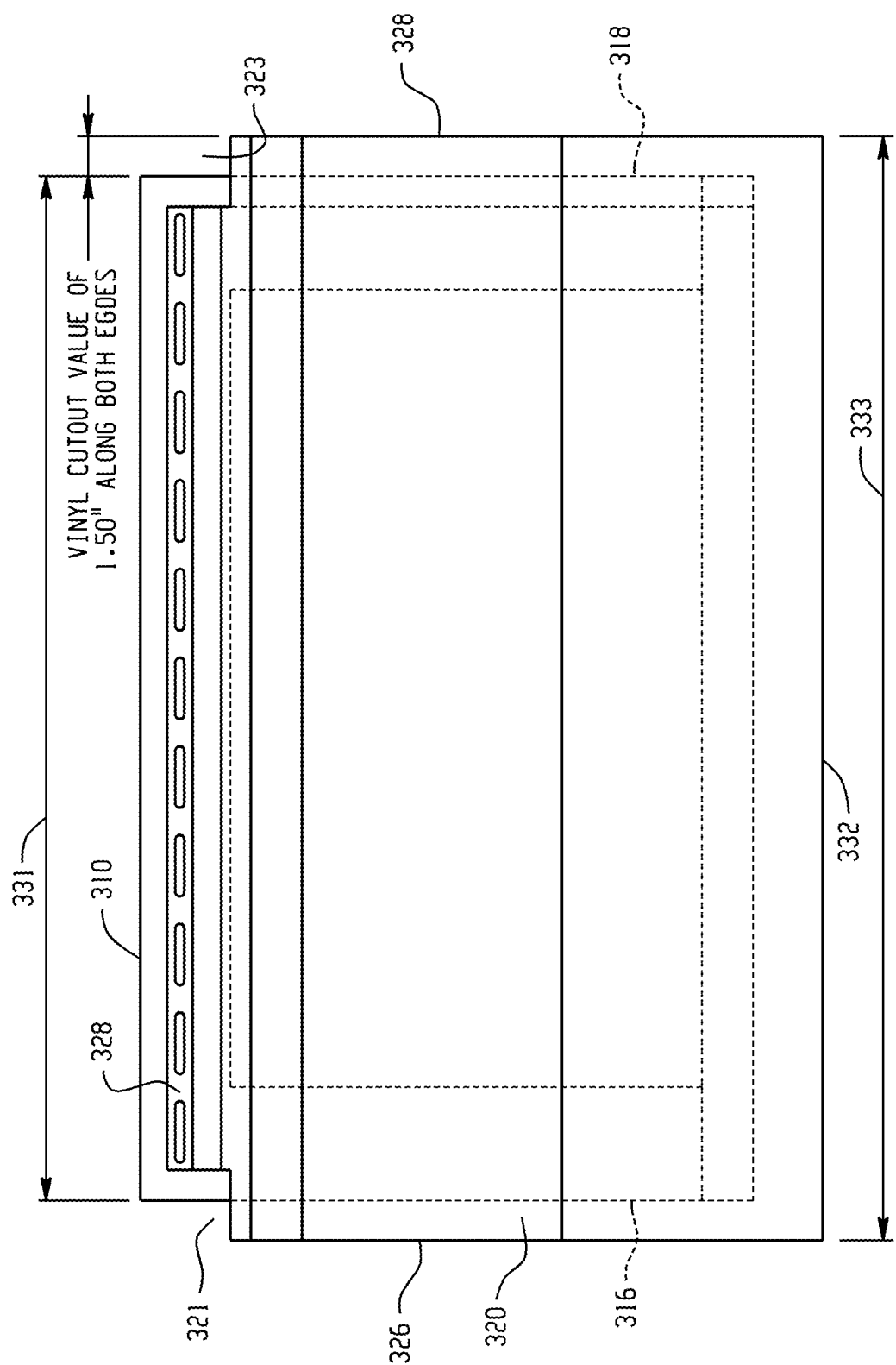
FIG. 15 is a front view of the prior art composite siding panel of FIG. 13. Solid lines indicate the perimeter of the siding member. The outer, lighter dashed lines indicate the perimeter of the portions of the backing member behind the siding member. The inner, darker dashed lines indicate where the placement of adhesive on the front face of the backing member starts and stops. The siding member includes vinyl cutouts along both edges of the siding member proximate a top end thereof.
Figure 16:
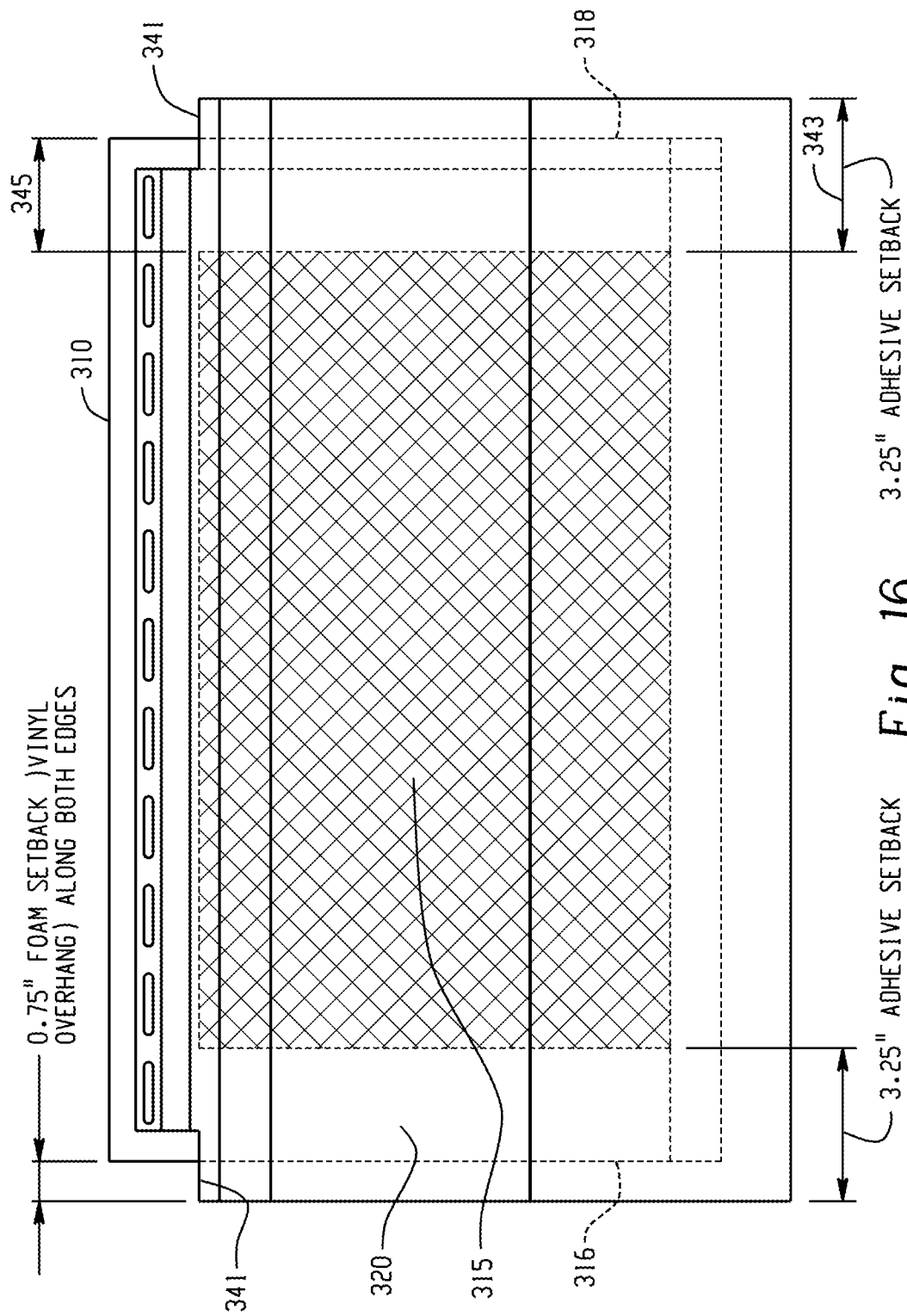
FIG. 16 is another front view of the prior art composite siding panel of FIG. 13, showing additional details. Again, solid lines indicate the perimeter of the siding member, and the outer dashed lines indicate the perimeter of the portions of the backing member behind the siding member. The shaded area and inner dashed lines indicate where the placement of adhesive on the front face of the backing member starts and stops. The siding member includes an overhang along both sides of the siding member.
Figure 17:
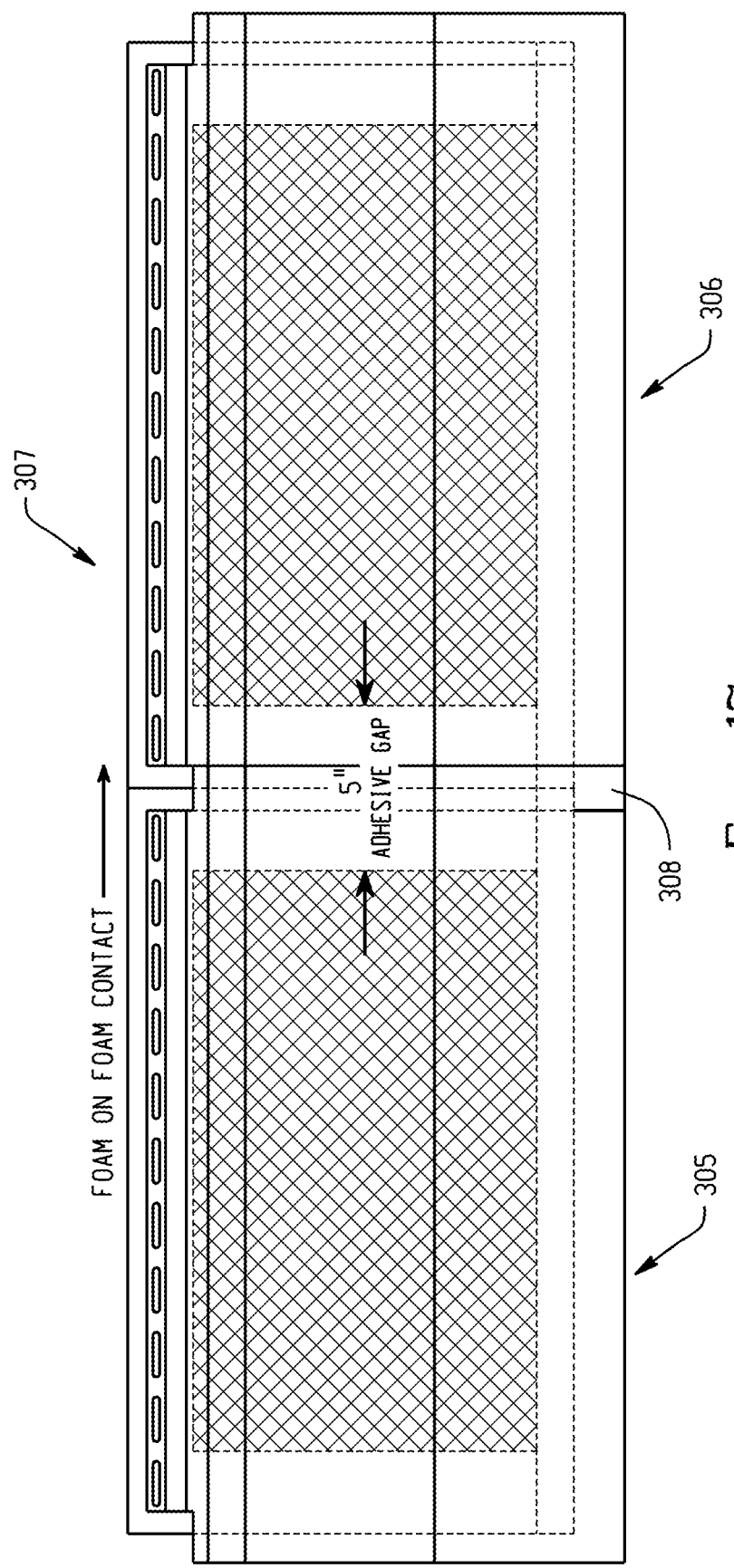
FIG. 17 is a front view of a prior art siding assembly comprising two of the composite siding panels of FIG. 13 placed side-to-side adjacent one another with the backing members abutting one another (i.e., foam on foam contact). Again, solid lines indicate the perimeters of the siding members, and the outer dashed lines indicate the perimeter of the portions of the backing members behind the siding members. The lighter shaded area and inner dashed lines indicate where the placement of adhesive on the front faces of the backing members starts and stops. The darker shaded area indicates the location of an adhesive gap (where no adhesive is present) between the backing members of the two adjacent siding panels.

FIGS. 13-16 show a prior art composite siding panel. FIG. 17 shows a prior art siding assembly.

Figure 13:
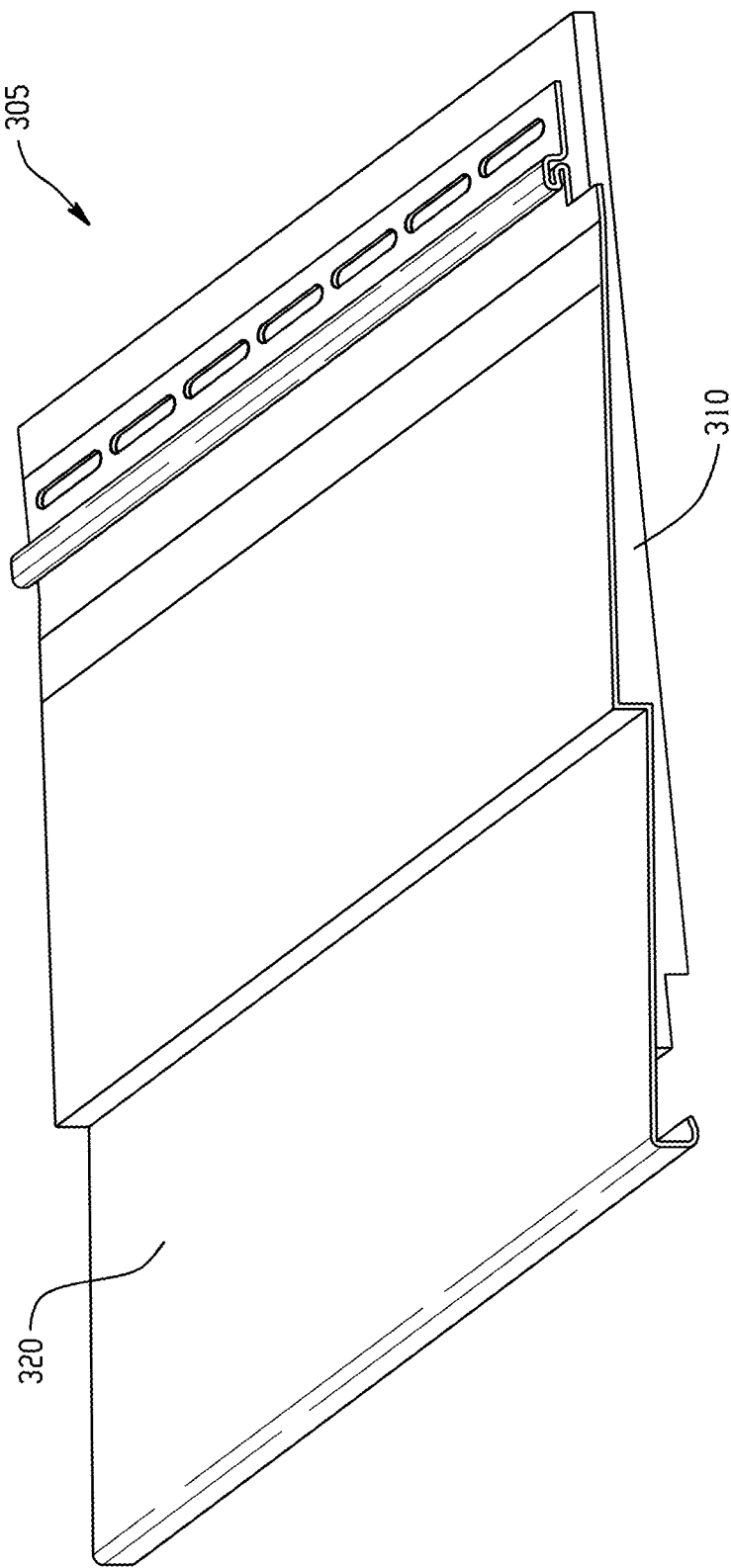
FIG. 13 is side perspective view of a prior art composite siding panel. The prior art composite siding panel includes a siding member and a backing member.
Figure 14A:
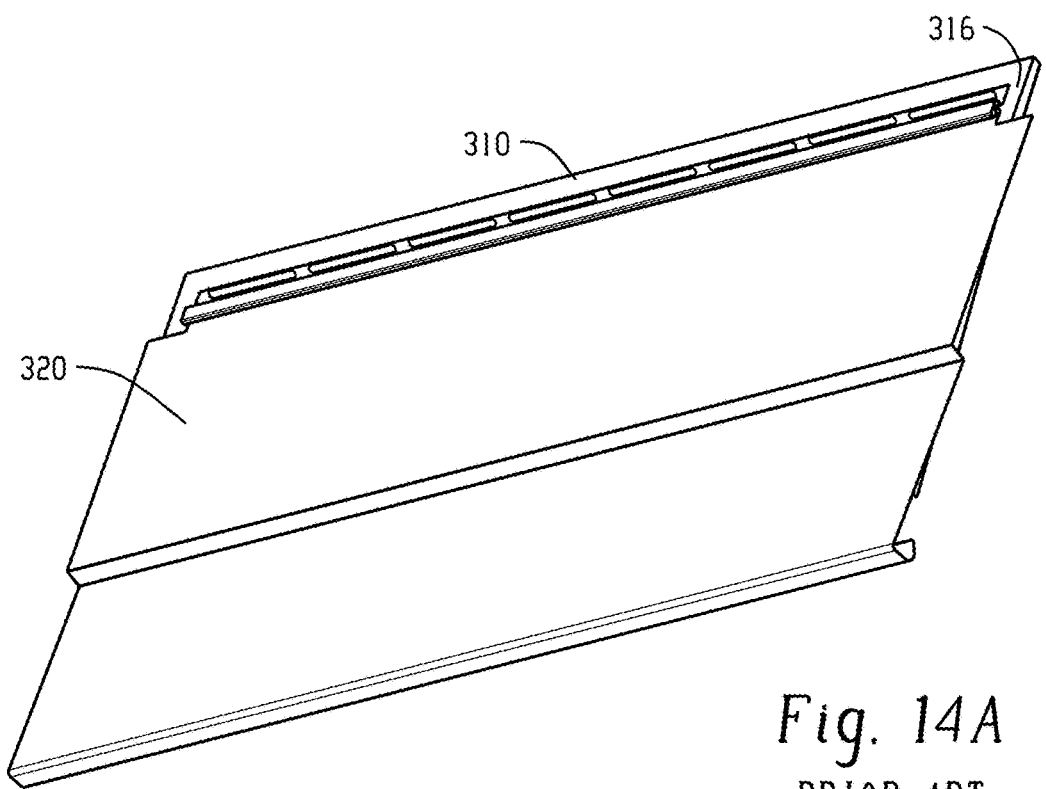
FIG. 14A is a front perspective view of the prior art composite siding panel of FIG. 13. The backing member is attached to the siding member and is centrally located between the laterally-extending side edges of the siding member. Both side edges of the siding member extend beyond the side faces of the backing member.
Figure 14B:
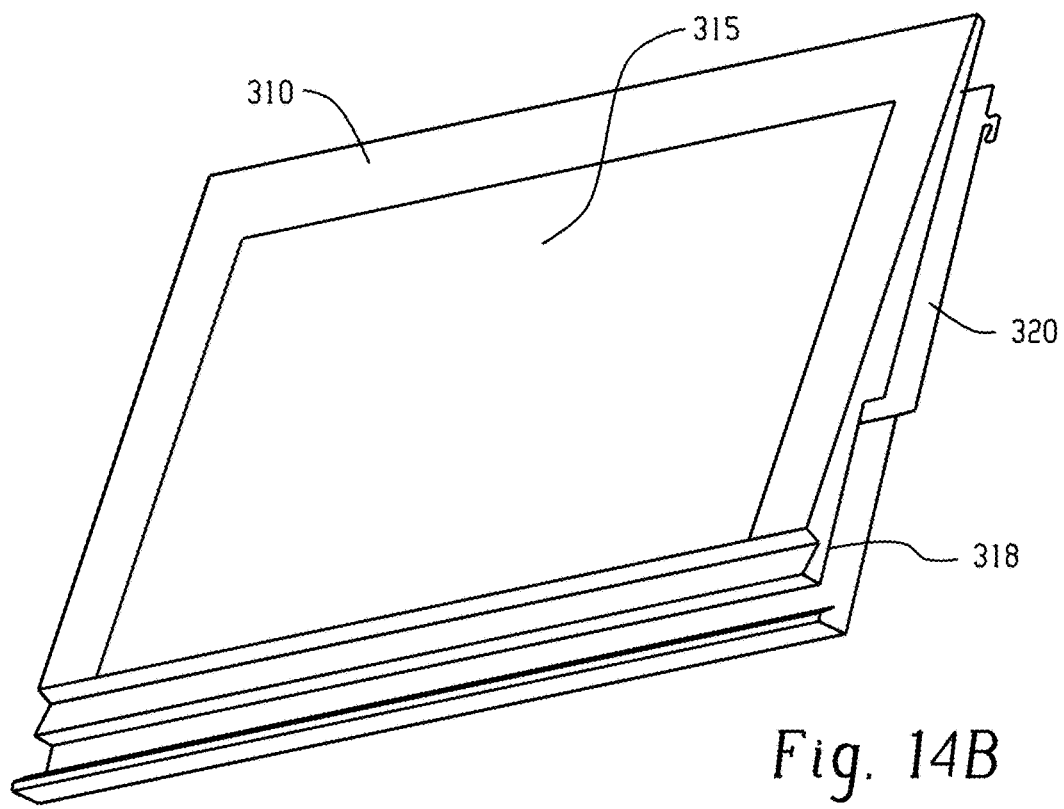
FIG. 14B is a rear perspective view of the prior art composite siding panel of FIG. 13. The backing member is centrally located between the laterally-extending side edges of the siding member, such that the siding member overhangs the backing member along both sides.

FIG. 13 generally shows the prior art siding system 305, which includes a backing member 310 and a siding member 320. As can be seen in FIG. 14A and FIG. 14B, the backing member 310 is attached to the siding member 320. As can be seen in FIG. 16, the backing member 310 includes adhesive 315 thereon, as indicated by shading. The adhesive 315 is centrally located on the backing member 310 between the laterally-extending side faces 316, 318 thereof, and is spaced apart from those side faces.

FIG. 15 is a front view that shows the placement of the backing member 310 relative to the siding member 320 and the relative placement of the adhesive 315 on the backing member 310. As can be seen in FIG. 15, the siding member 320 has a first side edge 326 and a second side edge 328 at the opposite side thereof. A nailing hem 330 is present at the top of the siding member 320. However, the length 331 of the nailing hem 330 along the top of the siding member is shorter than the length 333 of the bottom edge 332 of the siding member, with the nailing hem being centered along the top of the siding member 320. Put another way, the siding member 320 has cutouts 321, 323 along both the first and second side edges 326, 328 thereof. The cutouts are defined by how far the first and second side edges 326, 328 of the siding member 20 extend beyond the nailing hem. Here in this embodiment, each cutout has a length of 1.50 inches.

Continuing, the backing member 310 is located behind the siding member 320, and has a rectangular shape. The first side face 316 of the backing member 310 is spaced apart or away from the first side edge 326 of the siding member 320. The second side face 318 of the backing member 310 is also spaced apart or away from the second side edge 328 of the siding member 320. Put another way, the side faces of the backing member are not aligned with the side edges of the siding member. Rather, the backing member 310 runs from a point short of the first side edge 326 of the siding member 320 to a point short of the second side edge 328 of the siding member 320. This results in a small "overhang" on each side, where the side edge of the siding member extends beyond the backing member. The overhangs are better seen in FIG. 16, and are numbered with reference numerals 341, with each overhang having a length of 0.375 inches to 1.25 inches, with the most common overhang value being 0.75 inches.

With reference again to FIG. 16, the portion of the backing member 310 that is covered with adhesive 315 is indicated by shading thereon. As can be seen in FIG. 16, the adhesive 315 does not does not run completely to either of the laterally-extending front side edges of the backing member 310. Instead, the adhesive 315 is set back from both the first front side edge 316 of the backing member 310 and the second front side edge 318 of the backing member 310. This creates an adhesive setback 343 from the first and second side edges of the siding member, which here is 3.25 inches along both the first and second side edges 326, 328 of the siding member 320 (length indicated with reference numeral 343). There is no adhesive present in this setback, and it can be seen that there is no adhesive along the first 1.5 inches to 3.5 inches of each side of the front face of the backing member (length indicated with reference numeral 345), with the most common setback being 2.5 inches.

FIG. 17 illustrates a siding assembly 307 comprising two prior art composite siding panels 305, 306. The composite siding panels 305, 306 are placed side-to-side adjacent one another with the backing members abutting one another (i.e., foam on foam contact). As previously mentioned, there is commonly a 2.50 inch setback on each side of the rear face of the backing member. Thus, there is commonly a 5.00 inch adhesive gap (i.e., a zone in which no adhesive is present) between the backing members of the adjacent siding panels, although this adhesive gap can vary from 3.0 inches to 7.0 inches. The siding panel overhangs overlap each other in the zone with reference numeral 308. It is noted that because the prior art panels are symmetrical with the backing members of each siding panel centrally located on the siding members thereof, such that each siding panel has two overhangs and two adhesive setbacks, an adhesive gap will be present between two siding panels placed side-to-side, regardless of which siding panel overlaps the other.

The presence of adhesive gaps in prior art siding systems and assemblies leads to certain problems. The presence of such adhesive gaps does not allow the backing members to be seamlessly attached to the siding members. Furthermore, the siding members can be subject to undesirable buckling and stretching in the area of the adhesive gap, which results in an unacceptable, uneven, unsightly exterior surface. Disclosed herein are composite siding panels and assemblies that address the concerns of the aforementioned shortcomings or limitations of prior art siding systems and assemblies.

Figure 2A:
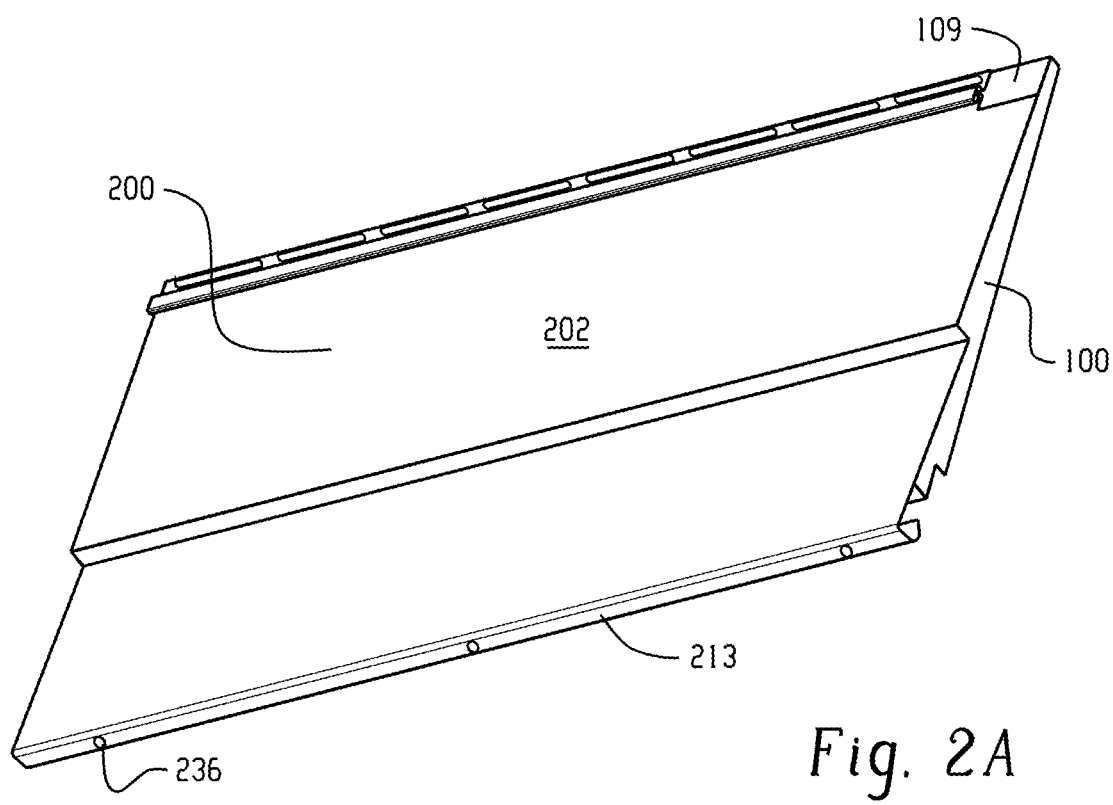
FIG. 2A is a front perspective view of the composite siding panel of FIG. 1.
Figure 2B:
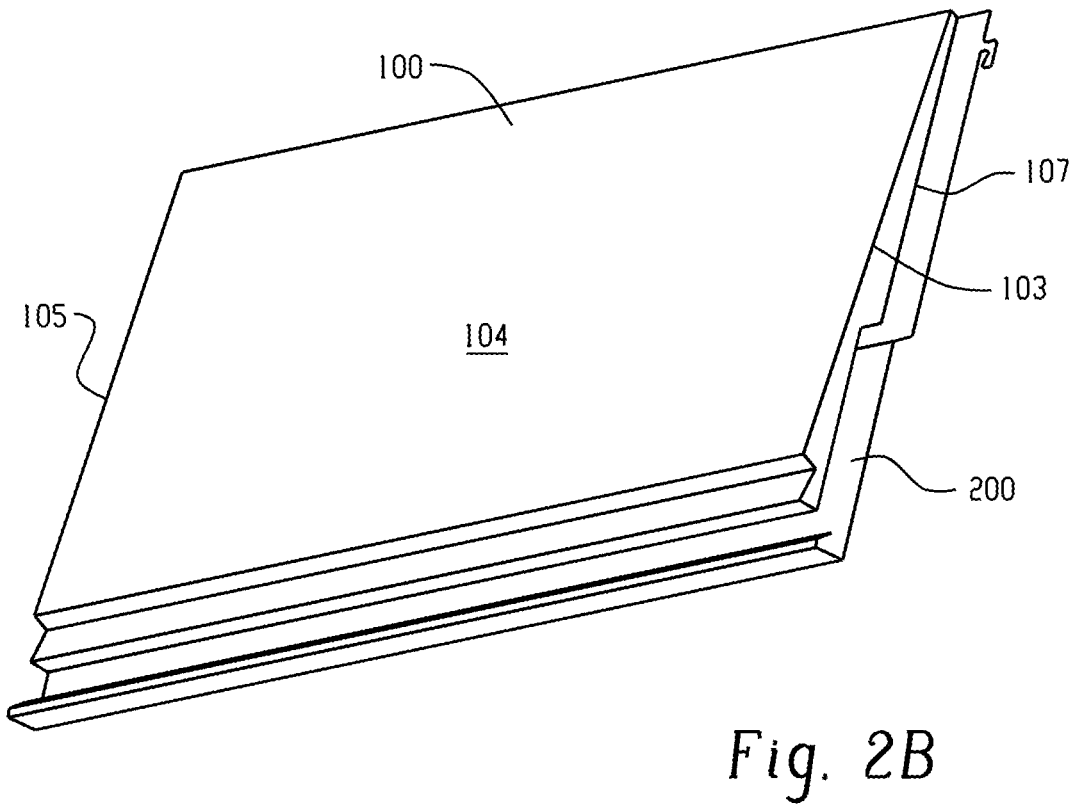
FIG. 2B is a rear perspective view of the composite siding panel of FIG. 1. The left side edge of the siding member extends outwardly beyond the left front side edge/left side face of the backing member to create an overhang, and the right side edge of the siding member is aligned with the right front side edge/right side face of the backing member.

FIG. 1 shows an improved composite siding panel 101 according to the present disclosure, which includes a backing member 100 and a siding member 200. As can be seen in FIG. 2A and FIG. 2B, the siding member 200 is in overlying relationship with and attached to the backing member 100. As can be further seen in FIG. 2A, the bottom face 213 of the siding member 200 can include several drainage holes 236 for expelling water or moisture that may be present behind the siding member 200 once the composite siding panel 101 is installed. It is noted that composite siding panels are typically several feet in length, and that they are depicted in these figures as being shorter for illustrative purposes only (so that both sides can be seen).

Figure 4:
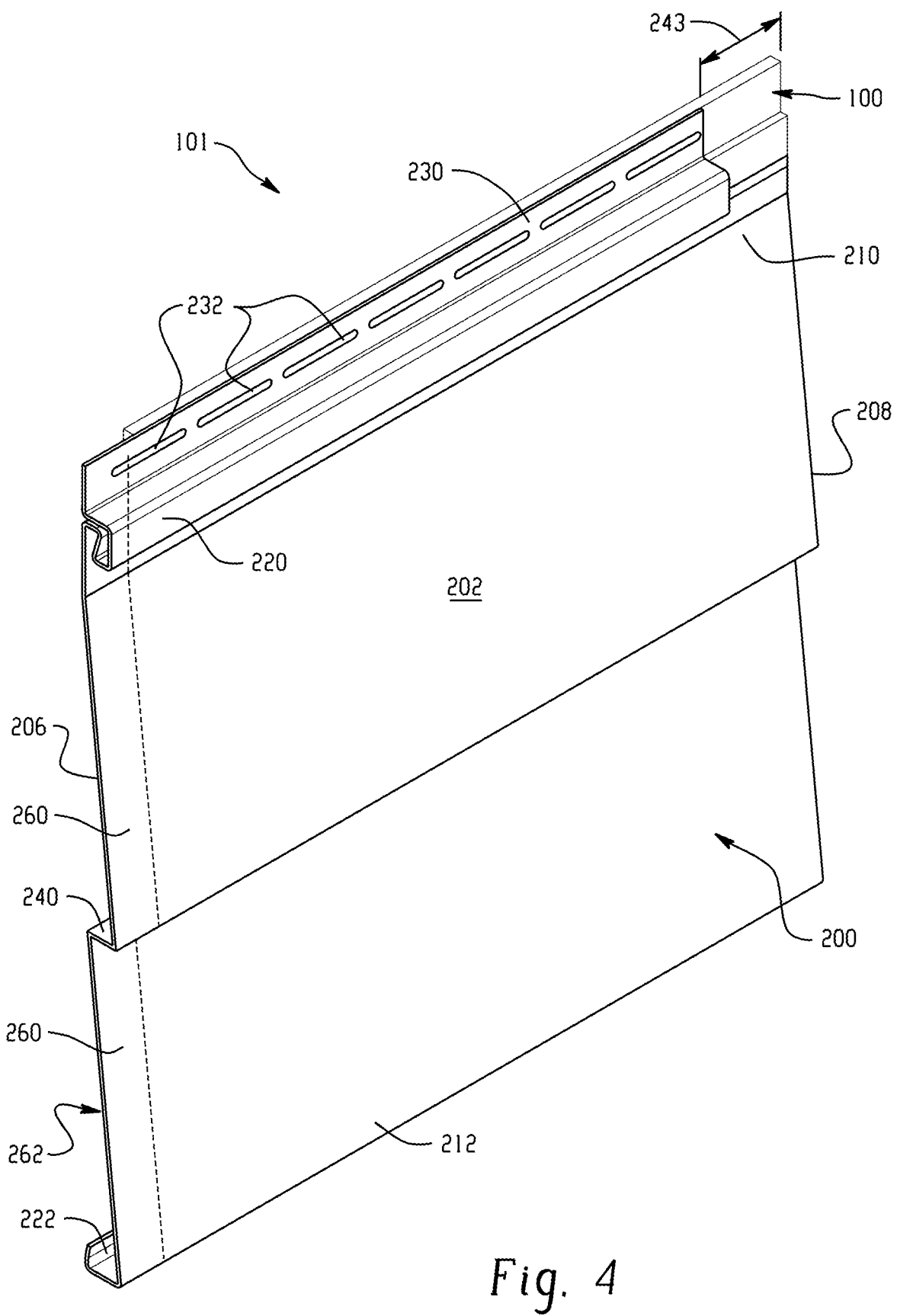
FIG. 4 is a left front perspective view of the composite siding panel of FIG. 1. The left side edge of the siding member extends outwardly beyond the left side face of the backing member (indicated by dotted line) to create an overhang. The right side edge of the siding member is aligned with the right front side edge/right side face of the backing member. A small portion of the front face of the backing member is visible behind the siding member where the nailing hem of the siding member runs short of the second side edge thereof.

FIG. 3A illustrates certain features of an exemplary siding member 200 according to one embodiment of the present disclosure. The siding member 200 has a front face 202 and a rear face 204, which are located opposite each other. As better seen in FIG. 4 and FIG. 5, the siding member 200 also includes longitudinally-extending first and second side edges 206, 208. In FIG. 4, the first side edge 206 of the siding member 200 is located along the left side thereof and the second side edge 208 of the siding member 200 is located along the right side thereof. The first and second side edges 206, 208 of the siding member 200 generally extend parallel to one another.

With reference back to FIG. 3A, the siding member 200 of this exemplary embodiment includes a locking flange 220 proximate a top end 210 of the siding member 200. The siding member 200 of this exemplary embodiment further includes a locking lip 222 proximate a bottom end 212 of the siding member 200. The locking flange 220 is complementary in shape to the locking lip 222. In this way, the locking flange 220 can operably engage or cooperate with the locking lip 222 of another siding member stacked above it.

The siding member 200 can be any desired shape or size, as will be appreciated by those skilled in the art, and usually have a length of several feet. In this regard, the siding member 200 can have any suitable configuration, profile, or contour suitable for a given application. The siding member 200 can be formed from any suitable material, namely a material suitable as an aesthetic outer surface of a building or the like. In particular embodiments, the siding member 200 can be formed of vinyl, polypropylene, aluminum, steel, fiberglass, engineered wood, or fiber cement. It is contemplated that the siding member 200 could have some other polymeric veneer profile. It is contemplated that the siding member 200 will be composed of a suitable polymeric material, with vinyl materials being particularly suitable. The siding member 200 can have any suitable thickness, which is usually less than 0.1 inches. Usually, the structural strength of the backing member 100 is such that the need for structural strength and integrity of the siding member 200 is minimized. It is contemplated that the siding member 200 can be composed of any suitable sheet or film stock material. Materials of choice typically will be materials resistant to extremes in the external environment over the life of the siding system. Non-limiting examples of environmental challenges include extremes in temperature, prolonged exposure to ultraviolet light, and/or certain levels of impact and vibrational challenges due to wind and the like. In this regard, it is contemplated that the siding member 200 will be composed of any suitable polymeric, metal, plastic (e.g., fiber-reinforced plastic), composite wood, or cementitious material capable of providing suitable environmental resistance and durability.

Figure 5:
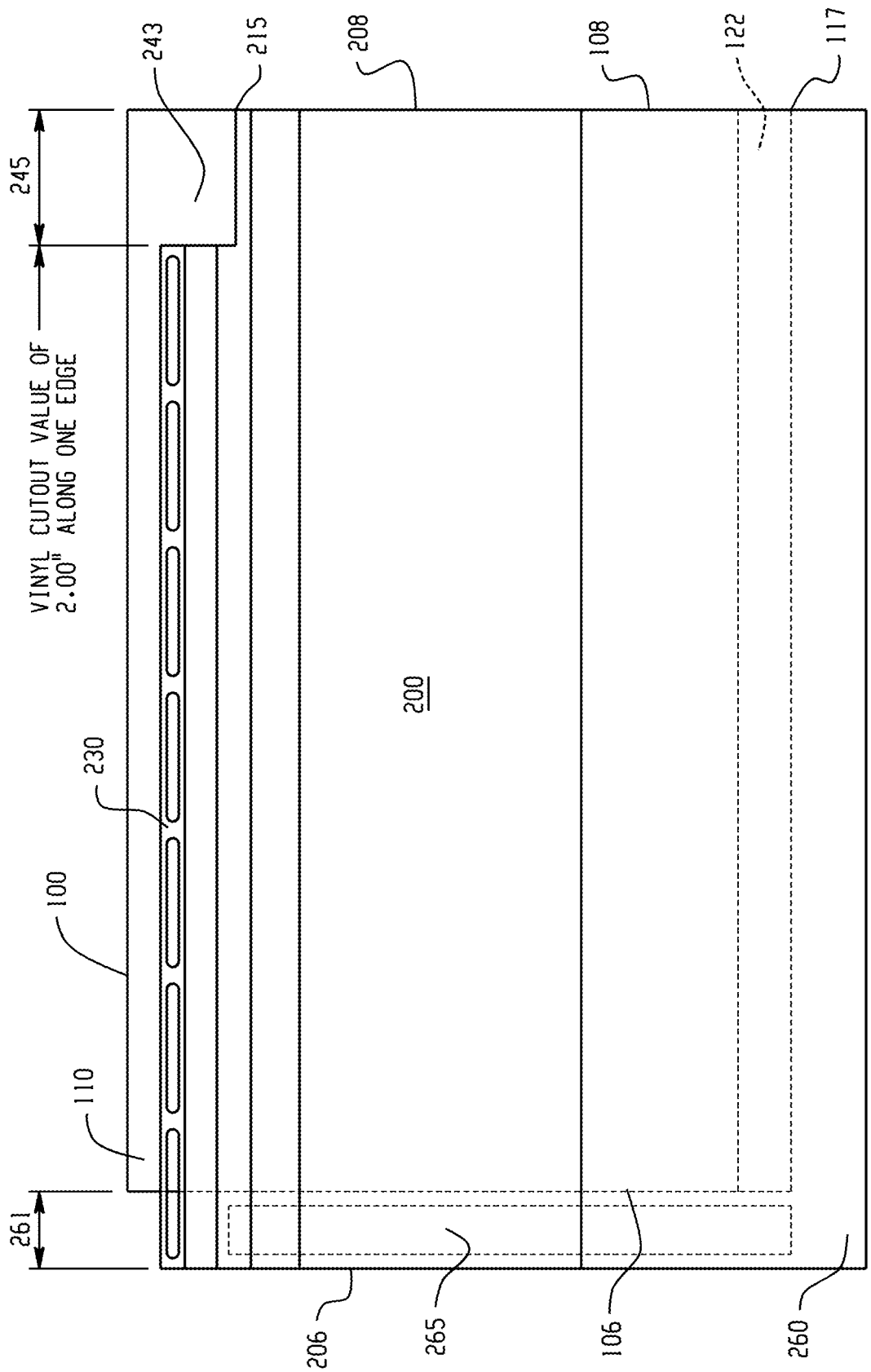
FIG. 5 is a front view of the composite siding panel of FIG. 1. Solid lines indicate the perimeter of the siding member. Dashed lines indicate the perimeter of the portion of the backing member that is behind the siding member. The top of the backing member is also visible above the siding member. The siding member includes a cutout along only the first side edge of the siding member proximate the top end thereof, such that a small portion of the front face of the backing member is visible behind the siding member.

FIG. 3B illustrates certain features of an exemplary backing member 100 according to the present disclosure. The backing member 100 has a front face 102 and a rear face 104, located opposite each other. The rear face 104 is planar, such that it is mountable on another planar surface, such as an exterior wall of a building. With reference to FIG. 5, the backing member 100 includes longitudinally-extending first and second side faces 106, 108. Front side edges 107, 109 (see FIG. 2A and FIG. 2B) are present at the intersection of the front face 102 with each side face 106, 108. For example, first front side edge 107 is present at the intersection of the front face 102 with the first side face 106, and second side edge 109 is present at the intersection of the front face 102 with the second side face 108. In FIG. 5, the first side face 106 of the backing member 100 is located along the left side thereof and the second side face 108 of the backing member 100 is located along the right side thereof. The first and second side faces 106, 108 of the backing member 100 are generally planar and extend parallel to one another.

With reference back to FIG. 3B, the backing member 100 of this exemplary embodiment includes a laterally-extending relief channel 122 defined in the rear face 104 and located proximate a bottom end 112 of the backing member 100. The relief channel 122 generally runs from the first side face 106 to the second side face 108 of the backing member 100 (i.e., from a first rear side edge 103 to a second rear side edge 105 of the backing member, as seen in FIG. 2B) and is configured to be complementary to the top end 110 of a longitudinally adjacent backing member located below it, or in other words so the top end fits in the relief channel 122 (see FIG. 8B). In this embodiment, they are shaped in the form of a tongue 110 and a groove 122, which are used to join adjacent panels together vertically. The backing member 100 also has a contour 140 defined therein. As can be seen with reference to FIG. 3A, the siding member 200 has one or more complementary-shaped contours 240 defined therein. In this way, the siding member 200 can be configured to be in overlying relationship with the backing member 100 and be closely attached thereto without any gap present therebetween. It is contemplated that the backing member 100 and the siding member 200 may have any suitable configuration desired or required to impart the aesthetic look desired. Put another way, the front face 102 of the backing member 100 can be angled with respect to the rear face 104 of the backing member 100.

The backing member 100 can be molded to any desired shape or size, as will be appreciated by those skilled in the art, and usually have a length of several feet. In particular embodiments, the backing member 100 can be composed of closed-cell expanded foam, such as a polymeric foam like expanded polystyrene (EPS) foam. In other embodiments, the backing member 100 can be formed from wire-fabricated foam.

Turning now to FIG. 4, another perspective view of the composite siding panel 101 is provided. As can be seen here, composite siding panel 101 is formed by configuring the rear face 204 of the siding member 200 to be in overlying relationship with and attached to the front face 102 of the backing member 100.

The siding member 200 can be attached to the backing member 100 in a wide variety of fashions. It is contemplated that connection can occur at any time between manufacture and installation such that the siding member 200 and backing member 100 are joined to one another in the installed or "in use" configuration. In the present disclosure, an adhesive is used to join the siding member 200 and backing member 100, though other non-limiting examples of attachment include procedures such as the use of mechanical fasteners and/or chemical bonding at any location either prior to or during installation. The methods can be mixed as desired or required.

Where adhesive materials are to be employed, the adhesive can be applied by any suitable method. An adhesive coating can be located between the siding member and the backing member. Put another way, an adhesive coating joins the rear face of the siding member to the front face of the backing member. The coating can be continuous or discontinuous. The adhesive material can be applied as one or more beads, ribbons, dots, or swirls. The adhesive can also be applied in a thin layer or the like. It is particularly contemplated that the adhesive material can be applied so as to substantially cover the rear face 204 of the siding member 200 or the front face 102 of the backing member 100 in the horizontal direction (e.g., to run substantially from the first side face 106/the first front side edge 107 to the second side face 108/the second front side edge 109 of the backing member 100. Again, it is noted that the margin of error for applying adhesive to these edges is ±3/16 inch. In certain applications, it is contemplated that the adhesive can be applied by a suitable spray applicator to provide a thin uniform adhesive coating over the tough durable skin of the backing member. The backing member 100 may have a smooth surface finish that fits snuggly with the siding member 200, thereby increasing adhesive mileage and reducing adhesive quantities, with the resulting bond being stronger. In this way, it may not be necessary to completely cover the backing member 100 with adhesive in order to suitably join the backing member 100 and the siding member 200. Suitable materials for the adhesive include continuously flexible non-latex adhesives, such as thermoplastic PSAs, UV curable adhesives and hot melt adhesives, such as polyamines and urethanes, glue, thermosetting or thermoplastic adhesives, or pressure sensitive adhesives. Non-limiting examples of suitable spray thermoplastic adhesive coating materials include those commercially available from National Starch under the trade name DUROTAK, or available from Henckel under the trade name PURHM QR9011.

Because they are to be attached to each other, the rear face 204 of the siding member 200 is generally shaped complementary to the front face 102 of the backing member 100, as previously explained. It is contemplated that the backing member 100 can be shaped to have a suitable configuration complementary to the configuration of the siding member 200 Suitable configurations are depicted in the various drawings, though other suitable configurations are possible, as will be appreciated by those skilled in the art. The degree of correspondence between the shape of the siding member 200 and the shape of the backing member 100, including any contours defined in either, can be at any degree from approximate to exact depending on various factors, including but not limited to the material type and/or thickness of the siding member 200.

As can be seen in FIG. 4 and FIG. 5, the second side face 108 of the backing member 100 is positioned contiguously with (i.e. lined up with or sharing an edge with) the second side edge 208 of the siding member 200. Put another way, the second side face 108 of the backing member 100 is aligned with the second side edge 208 of the siding member 208 when viewed from the front. The second front side edge 109 of the backing member 100 is therefore also positioned contiguously or aligned with the second side edge 208 of the siding member 200. In contrast, the first side face 106 and the first front side edge 107 of the backing member 100 are not positioned contiguously with or aligned with the first side edge 206 of the siding member 200. Rather, the first side edge 206 of the siding member 200 extends outwardly beyond the first side face 106 and the first front side edge 107 of the backing member 100, thereby creating an overhang 260, as indicated by the dashed line in FIG. 4. In other words, the overhang 260 runs from the first side edge 206 of the siding member 200 to the first side face 106/first front side edge 107 of the backing member 100, such that the width of the overhang 260 is defined by the distance between the first side edge 206 of the siding member 200 and the first side face 106/first front side edge 107 of the backing member 100. The rear surface of the overhang, or the rear surface of the siding member that makes up the overhang, is indicated with reference numeral 262 in FIG. 4. The width of the overhang is indicated as reference numeral 261 in FIG. 5. Also visible in FIG. 5 is dotted rectangle 265, which represents an adhesive layer that can optionally be placed on the rear surface of the overhang, as will be discussed further herein.

As can be further seen in FIG. 4, the siding member 200 includes a nailing hem 230 proximate a top end 210 of the siding member 200. The nailing hem 230 has a plurality of apertures 232 therein for securing the composite siding panel 101 to a surface, such as an exterior wall of a building. The nailing hem 230 generally runs from the first side edge 206 of the siding member 200 to short of the second side edge 208 thereof. Similarly, the locking flange 220 of the siding member 200 generally runs from the first side edge 206 of the siding member 200 to short of the second side edge 208 thereof. This results in a cutout 243 on the second side edge 208 of the siding member, but no cutout on the first side edge 206 of the siding member.

As explained above, the locking flange 220 and the nailing hem 230 generally run from the first side edge 206 of the siding member 200 to a point short of the second side edge 208 thereof, as shown in FIG. 5. This creates a cutout 243 along the second side edge 208 of the siding member 200. In particular embodiments, the cutout has a length 245 of about 2.00 inches (i.e., the distance from the second side edge 208 of the siding member 200 to the locking flange 220 and the nailing hem 230). As can be seen in FIG. 5, a top end 110 of the backing member 100 extends upwardly beyond a top end 210 of the siding member 200, and a portion of the backing member 100 is present behind the cutout 243 in the siding member 200. Thus, in some embodiments, adhesive can also be described as running substantially vertically from a bottom front edge 117 of the backing member to a top edge 215 of the siding member. Adhesive may also be present behind the nailing hem 230 if desired. In embodiments where the top edge of the siding member extends upwardly beyond the top edge of the backing member, the adhesive layer can be described as running substantially vertically from a bottom edge of the backing member to a top edge of the backing member.

Figure 6:
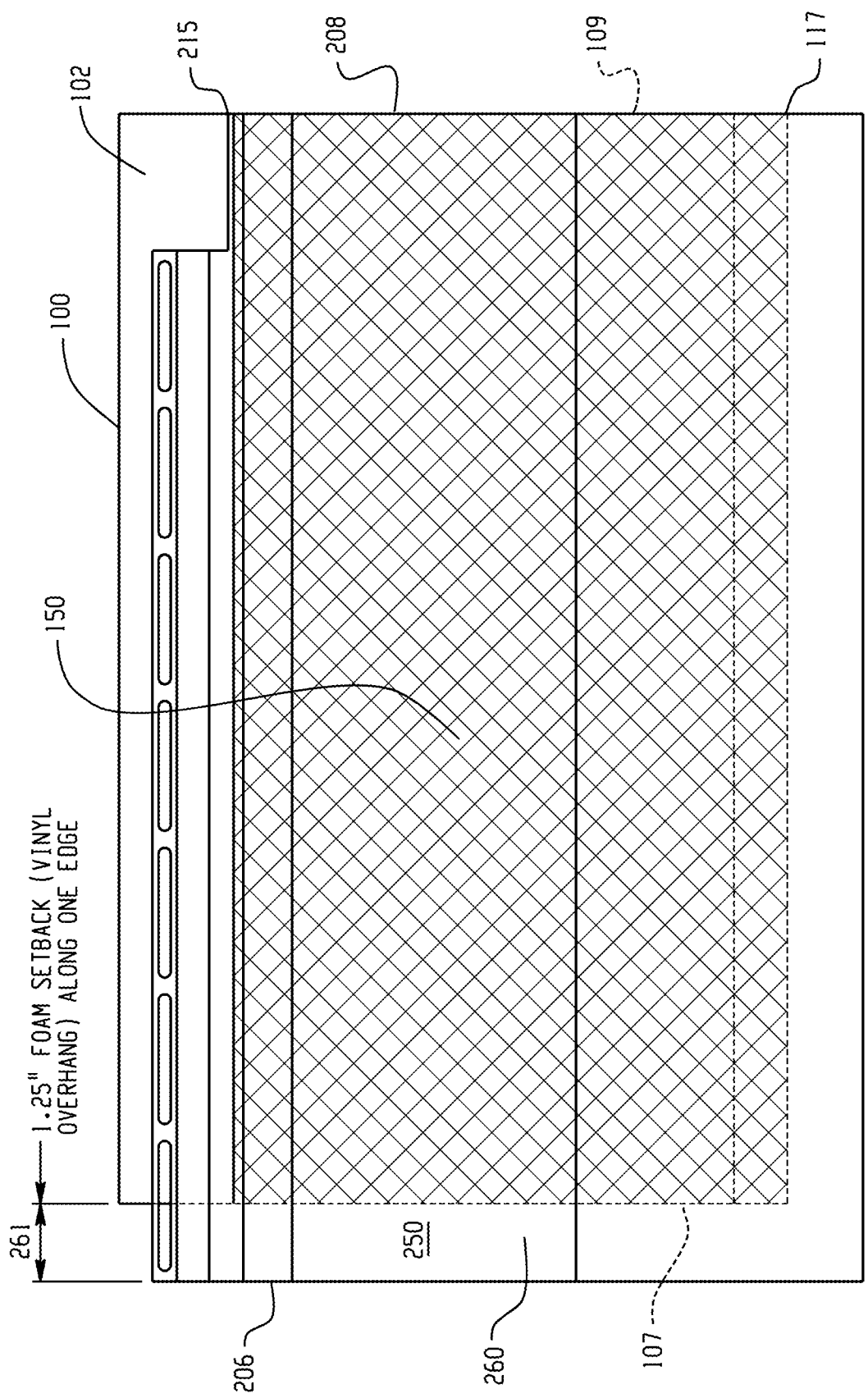
FIG. 6 is another front view showing different details of the composite siding panel of FIG. 1. Again, solid lines indicate the perimeter of the siding member, and dashed lines indicate the perimeter of portions of the backing member behind the siding member. The shaded area indicates where the placement of adhesive on the front face of the backing member starts and stops.

Turning now to FIG. 6, the adhesive coating 150 is illustrated upon the front face 102 of the backing member 100. In FIG. 6, the shaded portion indicates the area within which the adhesive coating 150 can be placed (i.e., where application of the adhesive generally starts and stops), and is not intended to indicate that the adhesive always covers the entire front face 102 of the backing member 100. The margin of error for applying adhesive to these edges is ±3/16 inch. The adhesive 150 can be applied discontinuously in the form of one or more beads, ribbons, dots, or swirls that run substantially from the first side face 106/first front side edge 107 to the second side face 108/second front side edge 109 of the backing member 100. The adhesive coating can also be continuous. In particular embodiments, the adhesive is continuous and covers substantially the entire front face 102 of the backing member from the top end 110 of the backing member 100 to the bottom end 112 thereof, and from the first front side edge 107 of the first side face 106 of the backing member to the second front side edge 109 of the second side face 108 of the backing member. In other words, the adhesive can be applied such that there is no adhesive setback from the second front side edge 109 of the backing member 100 on the composite siding panel 101 (again keeping in mind the ±3/16 inch margin of error). In other embodiments, the adhesive coating 150 extends from the bottom front edge 117 of the backing member 100 to the top edge 215 of the siding member 200, and from the first front side edge 107 of the first side face 106 of the backing member to the second front side edge 109 of the second side face 108 of the backing member.

It is contemplated that the adhesive on the front face 102 of the backing member 100 may be continuous over the entire surface of the front face 102 of the backing member 100 or may be discontinuous, i.e. in discrete locations instead, as explained above. The shaded area of FIG. 6 indicates the maximum size of the adhesive coating 150 (i.e., the areas within which the adhesive can be placed with a ±3/16 inch margin of error).

Deposition of the adhesive coating 150 can be by any suitable method with methods that reduce or eliminate telegraphing through the overlying siding member being preferred. Thus, spray deposition can be utilized as well as methods such as extrusion, roller coating, curtain coating, and the like.

In particular embodiments, such as that shown in FIG. 6, the siding member overhangs the backing member by at least ⅜ inch (0.375 inches) and up to a maximum of about 1.25 inches (indicated by length 261), with most panels having a 0.75 inch overhang. Again, no overhang is present along the second side edge 208 of the siding member 200 because the second side face 108/second front side edge 109 of the backing member 100 is positioned contiguously with or is aligned with the second side face 208 of the siding member 200. In particular embodiments, the overhang 260 has a length 261 that is less than the length 245 of the cutout 243. The difference in their lengths can be from about 0.25 inches to about 1.0 inches.

Figure 7:
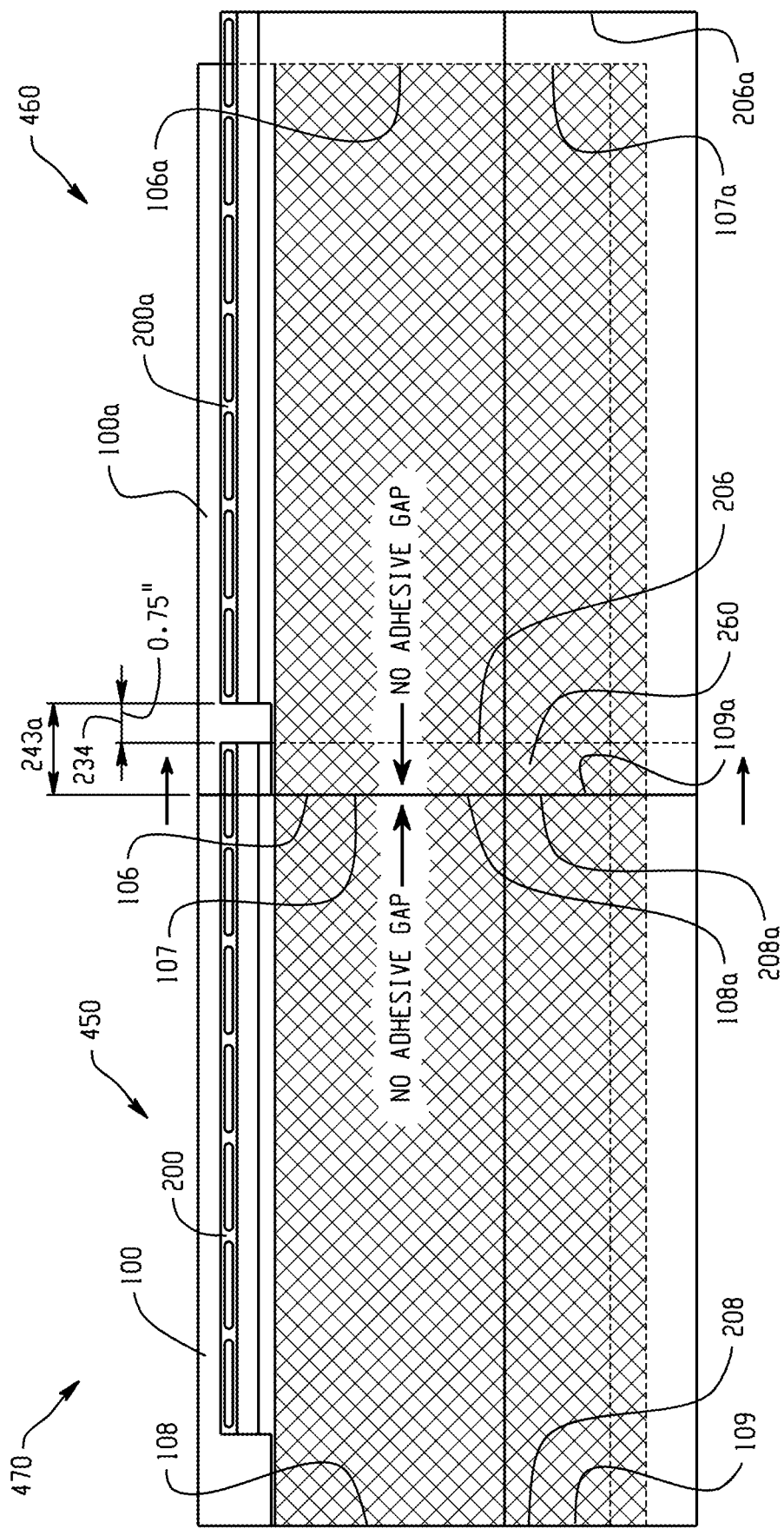
FIG. 7 is a front view of a siding assembly according to the present disclosure comprising two composite siding panels placed side-to-side adjacent one another with the backing members abutting one another (i.e., foam on foam contact). The solid lines indicate the perimeters of the siding members, and dashed lines indicate the locations of portions of the backing members behind the siding members. The shaded areas indicate where the placement of adhesive starts and stops on the front faces of the backing members. No adhesive gap is present between the backing members of the two adjacent siding panels.

FIG. 7 illustrates an improved siding assembly 470 according to the present disclosure. The assembly 470 comprises two composite siding panels 450, 460. Please note that these composite siding panels differ from those in FIG. 6 in that the first side and the second side are now reversed. The composite siding panels 450, 460 are placed laterally adjacent one another (i.e. side-to-side) with the backing members abutting one another (i.e., foam-on-foam contact). Because the front faces of the backing members 100, 100a are covered with adhesive running substantially from the first side face/first front side edge to the second side face/second front side edge of the backing members, installation of the siding systems 450, 460 side-by-side results in no adhesive gap being present between the backing members (or at most 5/16 inch, considering the margin of error). Thus, the undesirable adhesive gap present in prior art siding systems and assemblies is eliminated.

As seen here, composite siding panel 450 has a backing member 100 with first side face 106 and second side face 108 and first front side edge 107 and second front side edge 109, and also has a siding member 200 with first side edge 206 and second side edge 208. Composite siding panel 460 has a backing member 100a with first side face 106a and second side face 108a and first front side edge 107a and second front side edge 109a, and also has a siding member 200a with first side edge 206a and second side edge 208a. The first side face 106 of backing member 100 abuts second side face 108a of backing member 100a. The first side edge 206 of siding member 200 lies over the siding member 200a, while the second side edge 208a of siding member 200a is aligned with the second side face 108a and the second front side edge 109a of the backing member 100a.

Due to the cutout 243a along the second side edge 208a of the siding member 200a of the composite panel 460 being longer than the overhang 260 of composite panel 450, there is a gap 234 between the nailing hems and locking flanges of adjacent siding panels, as shown in FIG. 7. In particular, due to the 2.00 inch cutout and the 1.25 inch overhang, installation of the siding systems 450, 460 of this exemplary embodiment results in a 0.75 inch gap between the nailing hems and locking flanges of the adjacent composite siding panels 450, 460. Such a gap 234 permits vinyl siding members, which have high coefficients of expansion and contraction, especially when exposed to heat, such as from sun exposure, to expand without undesirably interfering with the adjacent siding member. This, coupled with the use of an adhesive to join backing members and siding members as described herein, prevents or eliminates the undesirable buckling and stretching encountered with prior art siding systems and assemblies.

FIG. 8A and FIG. 8B illustrate one exemplary embodiment of how two identical and longitudinally adjacent siding panels 450, 460 can be installed one above the other. In FIG. 8A, siding panel 450 is to be installed above siding panel 460, as indicated by the arrow showing in what direction the panels are joined.

The lower siding panel 460 includes a locking flange 220 and the upper siding panel 450 includes a locking lip 222. The locking flange 220 of the lower siding panel 460 is complementary in shape to the locking lip 222 of the upper siding panel 450. In this way, the locking flange 220 of the lower siding panel 460 is configured to operably engage with the locking lip 222 of the upper siding panel 450. FIG. 8B shows laterally adjacent siding panels 450, 460 operably engaged with one another via the locking flange 220 of siding panel 460 and the locking flange 222 of siding panel 450.

The upper siding panel 450 includes a laterally-extending relief channel 122. The relief channel 122 is configured to be complementary to top end 110 of the lower siding panel 460. FIG. 8B shows laterally adjacent siding panels 450, 460 with the relief channel of the upper siding panel 450 engaging the top end of the lower siding panel 460. As shown in FIG. 8B, the top end of the lower siding panel 460 extends at least partially into the relief channel of the upper siding panel 450. The top end does not need to entirely fill the relief channel.

Figure 9:
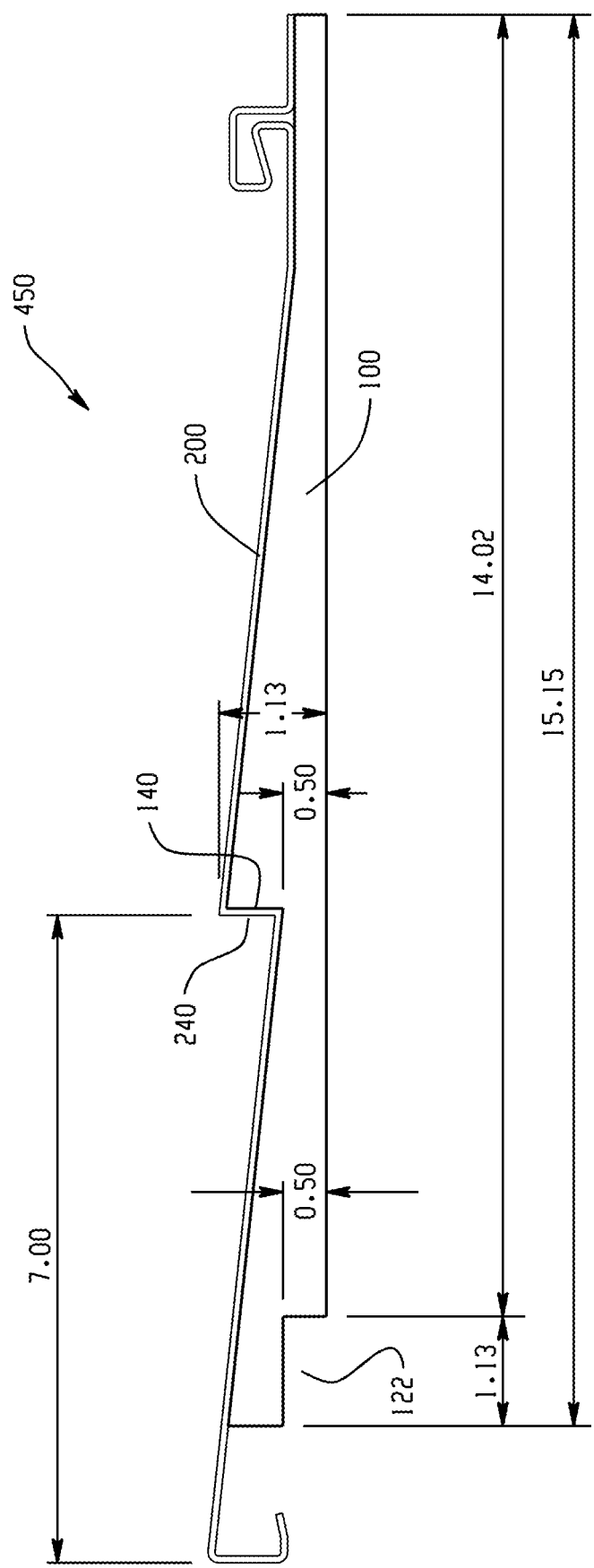
FIG. 9 is a side view of a composite siding panel according to the present disclosure showing exemplary dimensions for the siding member and the backing member.

FIG. 9 illustrates an exemplary embodiment of a siding panel 450 according to the present disclosure, with exemplary dimensions (all of which are in inches in this figure). In this exemplary embodiment, the relief channel in the rear face of the backing member 100 has a height of about 1.13 inches and a depth of about 0.50 inches. The siding member 200 has a total length of about 17 inches. The length of the portion of the siding member 200 below the contour 240 therein is about 7.00 inches, and the length of the portion of the siding member 200 above the contour 240 therein is about 10.00 inches. The contour 240 in the siding member 200 and the contour 140 in the backing member 100 each have a depth of about 1.13 inches. The backing member 100 has a thickness of about 0.50 inches along its top end. The backing member 100 has a total length of about 14.02 inches. It is noted that in this embodiment, the top edge of the siding member extends beyond the top edge of the backing member. Thus, the adhesive coating could extend vertically substantially from the bottom edge of the backing member to the top edge of the backing member, if desired.

The composite siding panels and siding assemblies disclosed herein may include additional features, as will be appreciated by those skilled in the art. For example, the opposing first and second side edges of the backing member can include an interlocking tab and slot arrangement. Examples of such an interlocking tab and slot arrangement can be found in commonly-owned U.S. Pat. No. 8,910,444, the entire contents of which are hereby fully incorporated by reference.

Figure 10:
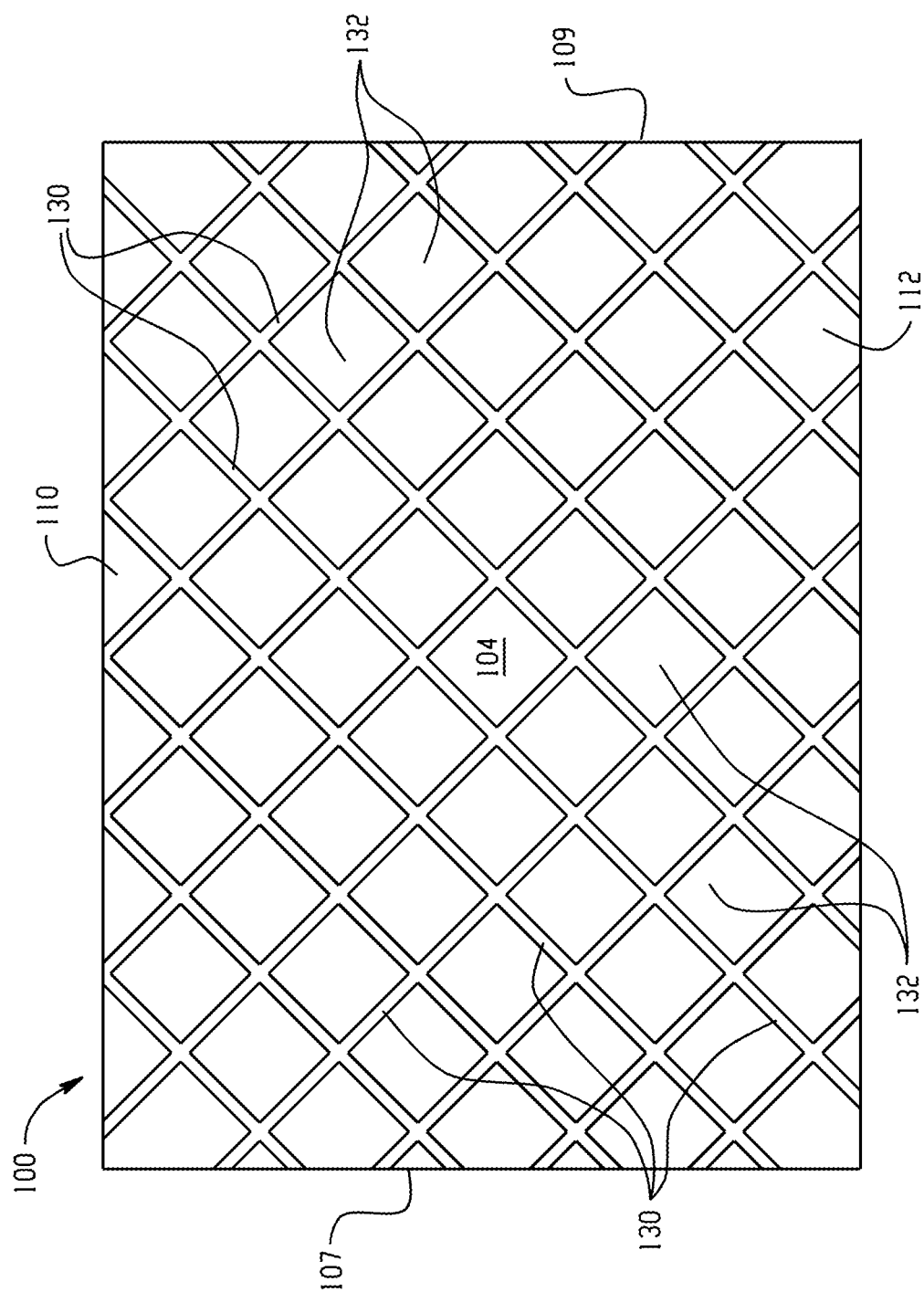
FIG. 10 is a rear view of one embodiment of a backing member according to the present disclosure. The rear face of the backing member can include drainage grooves operable to remove water from an exterior wall to which the backing member is mounted.

As another example, the backing member 100 can include drainage grooves 130 in the rear face 104 thereof, as seen in FIG. 10. As seen in FIG. 10, the drainage grooves 130 extend into the rear face 104 of the backing member 100, such that projections or protrusions 132 are defined between the drainage grooves 130. In this way, upon mounting the backing member 100 to a surface, such as the exterior wall of a building, the projections 132 are seated directly against the surface of the exterior wall, while the drainage grooves 130 do not contact the surface of the exterior wall. As such, the drainage grooves 130 are operable to remove water or other moisture from the surface of the exterior wall so as to prevent molding. It is further noted that, as seen in FIG. 10, the drainage grooves 130 are designed to extend continuously from the top end 110 of the backing member 100 to the bottom end 112 thereof. Because they are oriented diagonally, the drainage grooves also run from the first rear side edge 107 of the backing member 100 to the second rear side edge 109 thereof, and vice versa.

As an additional example, as previously described with respect to FIG. 4 and FIG. 5, an adhesive layer 265 can be present on the rear surface of the overhang. In this regard, warping can occur in vinyl siding, which results in an undesirable appearance, particularly at the interface between vinyl siding panels. This is due to the expansion and contraction of the vinyl. The adhesive layer 265 should be made from adhesives such as an acrylic adhesive, which can withstand large temperature differences from −20° F. to +180° F. while remaining flexible. In contrast, liquid-based adhesives, such as epoxy adhesives, have been found to be unable to withstand such temperature differences, breaking down so that vinyl siding panels do not remain adhered to each other.

In practice, the acrylic adhesive is usually provided in the form of a double-sided coated tape with release liners. The tape can be applied to join the overhang of one siding member of a first composite siding panel to the siding member of an adjacent second composite siding panel. An example of an acrylic adhesive that has been found to work is 3M VHB tape, which is a tape with a foam core and adhesive applied on both sides thereof. Specific examples include 3M VHB RP25, VHB RP32, and VHB 4936 tapes. The adhesive may have a 90° peel adhesion strength of about 30 N/cm. Other examples include 3M JVCC DC-SCRIM-3 tape and 3M F9465PC tape, which are also based on acrylic adhesives. It should be noted that the double-sided coated tape should use a foam core and adhesive on both surfaces thereof. It has been found that double-sided tapes which have a polymeric sheet core (instead of a foam core) are not effective during field usage because as the siding member expands and contracts during temperature changes, the adhesive smears on the siding member and separates from the polymeric sheet core. Such smearing and separation does not occur with foam cores. The double-sided tape may have a thickness of about 0.010 inch to about 0.05 inches. Generally, a thinner tape is preferred because it is more visually pleasing when applied.

Figure 11:
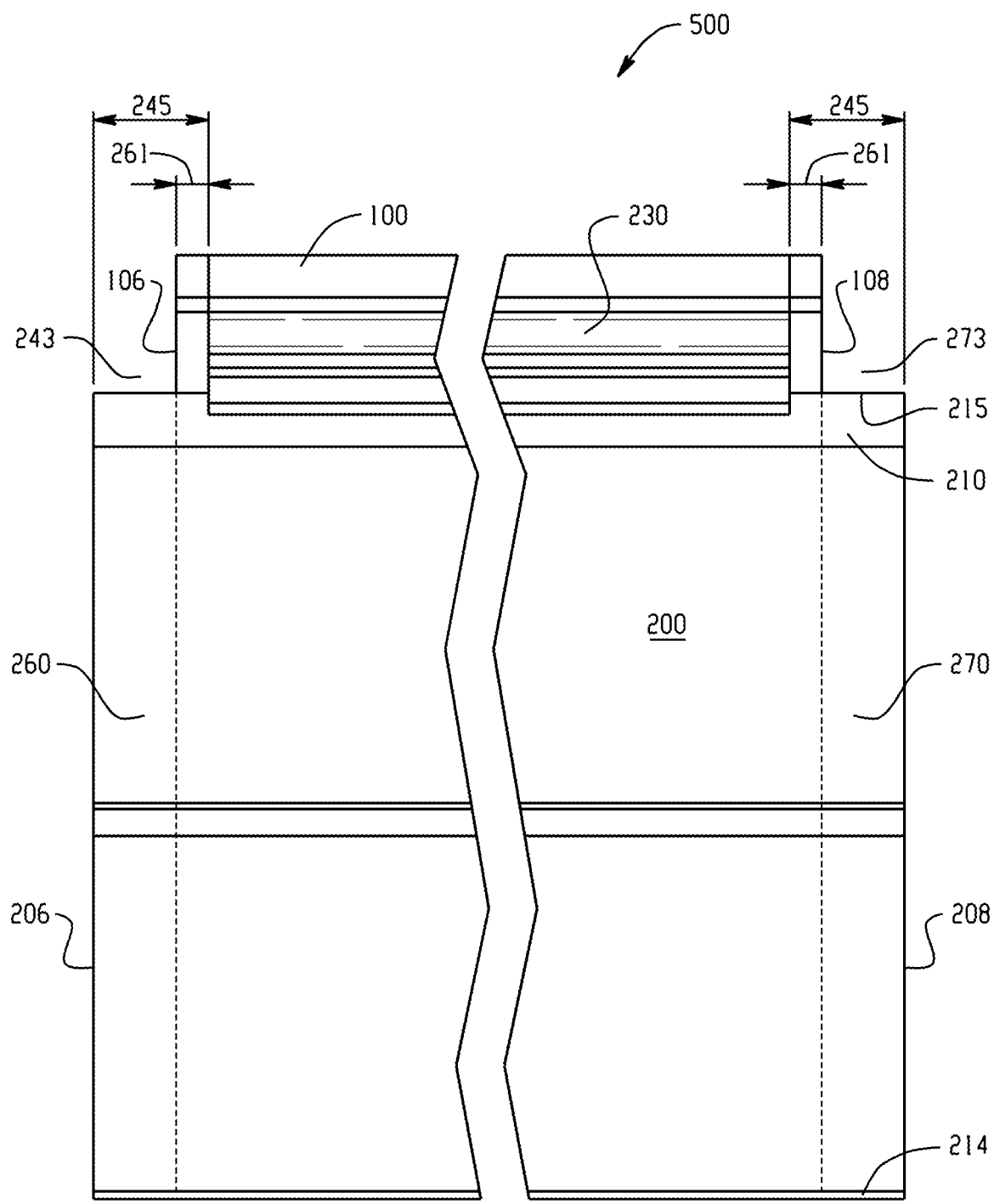
FIG. 11 is a front view of a bi-directional composite siding panel according to the present disclosure. The siding member extends beyond both sides of the backing member. Only the sides of the bi-directional panel are shown, and the panel can be of any desired length.

FIG. 11 is a front view of another embodiment of the composite siding panel of the present disclosure. The bi-directional composite siding panel 500 is also formed from a backing member 100 and a siding member 200.

The siding member 200 has a first side edge 206 and a second side edge 208 at the opposite side thereof. A nailing hem 230 is present at the top end 210 of the siding member 200. The siding member 200 has cutouts 243, 273 along the first and second side edges 206, 208 thereof. The cutouts are defined by how far the first and second side edges 206, 208 of the siding member 208 extend beyond the nailing hem. Put another way, the length of the nailing hem 230 along the top of the siding member is shorter than the length of the bottom edge 214 of the siding member, with the nailing hem being centered along the top of the siding member. Each cutout has a length 245 of about 1.0 inches to about 3.0 inches.

Continuing, the backing member 100 is located behind the siding member 200, and has a rectangular shape. The first side face 106 of the backing member 100 is spaced apart from the first side edge 206 of the siding member 200. The second side face 108 of the backing member 200 is also spaced apart from the second side edge 208 of the siding member 200. Put another way, the side faces of the backing member are not aligned with the side edges of the siding member. Rather, the backing member 100 runs from a point short of the first side edge 206 of the siding member 200 to a point short of the second side edge 208 of the siding member 200. This results in the siding member having a first side overhang 260 on the first side and a second side overhang 270 on the second side (indicated with dotted line). Each overhang has a length 261 of from least ⅜ inch to about 1.25 inches.

The siding member and the backing member are joined to each other by an adhesive coating, which is placed so as to avoid an adhesive gap. Again, the adhesive coating runs substantially from the first side face 106/the first front side edge of the backing member to the second side face 108/the second front side edge of the backing member 100. The adhesive layer is present in the overlapping portions of the siding member and the backing member. The adhesive layer also runs substantially vertically between the overlapping portions of the siding member and the backing member, e.g. from a bottom front edge (not visible) of the backing member 100 to a top edge 215 of the siding member 200). Again, it is noted that the margin of error for applying adhesive to these edges is ±³⁄₁₆ inch.

Figure 12:
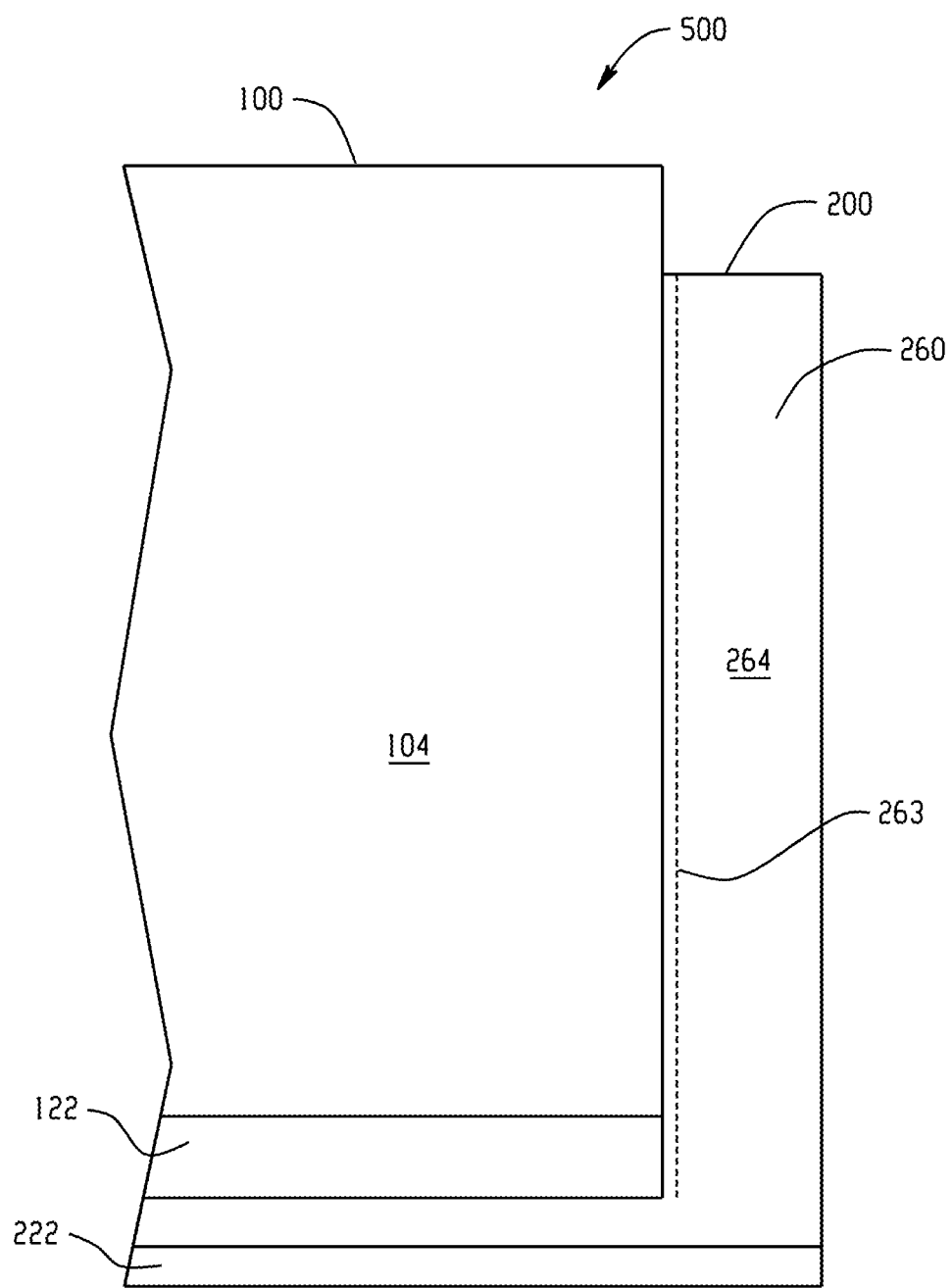
FIG. 12 is a rear view of a bi-directional composite siding panel according to the present disclosure. As seen here, indicia are present on the rear surface of the siding member in the overhang.

FIG. 12 is a rear view of one side of the bi-directional composite panel 500. The rear face 104 of the backing member 100, the siding member 200, and the first side overhang 260 are visible, specifically the rear surface 264 of the first side overhang. Also visible are the relief channel 122 in the backing member, and the locking lip 222 of the siding member. Indicia 263 are illustrated here on the rear surface 264 of the first side overhang (and are present on the second side overhang as well). The indicia can be, for example, shallow notches or scores, used to indicate where the overhang can be cut. However, such indicia are not necessary.

It is contemplated that in the field during usage by siding installation personnel, one of the overhangs of the bi-directional panel will be cut off by the installer, converting the bi-directional panel of FIG. 11 into a uni-directional panel like that shown in FIGS. 1-7. In this regard, the siding installer prefers as much as possible to purchase (and keep in inventory) only one type of siding panel. However, it is also more aesthetically pleasing to arrange siding on a building such that the overhanging portion of the siding panel faces away from the front of the building. Providing this aesthetically pleasing arrangement normally requires two types of uni-directional panels (one with the overhang on the right-hand side, one with the overhang on the left-hand side), one for each side of the house. The bi-directional panel permits installers to stock only one type of panel in inventory, but still provide the aesthetically pleasing arrangement on the exterior of the building. The indicia 263 can be used to indicate where the overhang is to be cut.

It is contemplated that various cellular plastics can be employed as the material for the backing members disclosed herein. As used herein, the term(s) "cellular foam" or "cellular foam plastic" are taken to mean a plastic or polymeric material with numerous cells of trapped air distributed throughout its mass. Suitable examples of such materials can also be referred to as expanded plastics or foamed plastics with expanded polystyrene foam being but one non-limiting example.

"Expanded polystyrene foam" as used herein refers to cellular foam plastic made from polystyrene typically by incorporation of a volatile blowing agent into polystyrene beads as they are polymerized or afterward. In expanded polystyrene, beads of polystyrene are first pre-expanded and allowed to rest for a suitable interval, then molded in closed steam-heated shaped molds to produce closed-cell molded foams. The size and density of the closed cells can vary from application to application.

The backing members of the present disclosure can have a tough, durable, smooth skin on the outer surface of the front and rear faces as well as any ends, edges, and additional surfaces. It is contemplated that the siding member may be traditional vinyl veneer material at thickness measuring from about 0.020 to about 0.036 inches. Various other polymeric or coating materials as would be cost effective can be used.

The backing member can also have various three-dimensional features located on one or more of the front face, rear face, top end, bottom end, or side edges as would be suitable for the associated composite siding panel. The three-dimensional features can include but are not limited to ridges, grooves, indents, detents and the like. Such geometric features can be imparted in a single operation by the shape molding process.

The backing member can also be pigmented as desired or required. In situations where the siding member is extremely thin, it is contemplated that the backing member can be pigmented to complement the color of the extremely thin siding member.

The following examples are presented to illustrate the composite panels described herein, and are not intended to limit the present disclosure.

EXAMPLES

Example 1

Figure 18A:
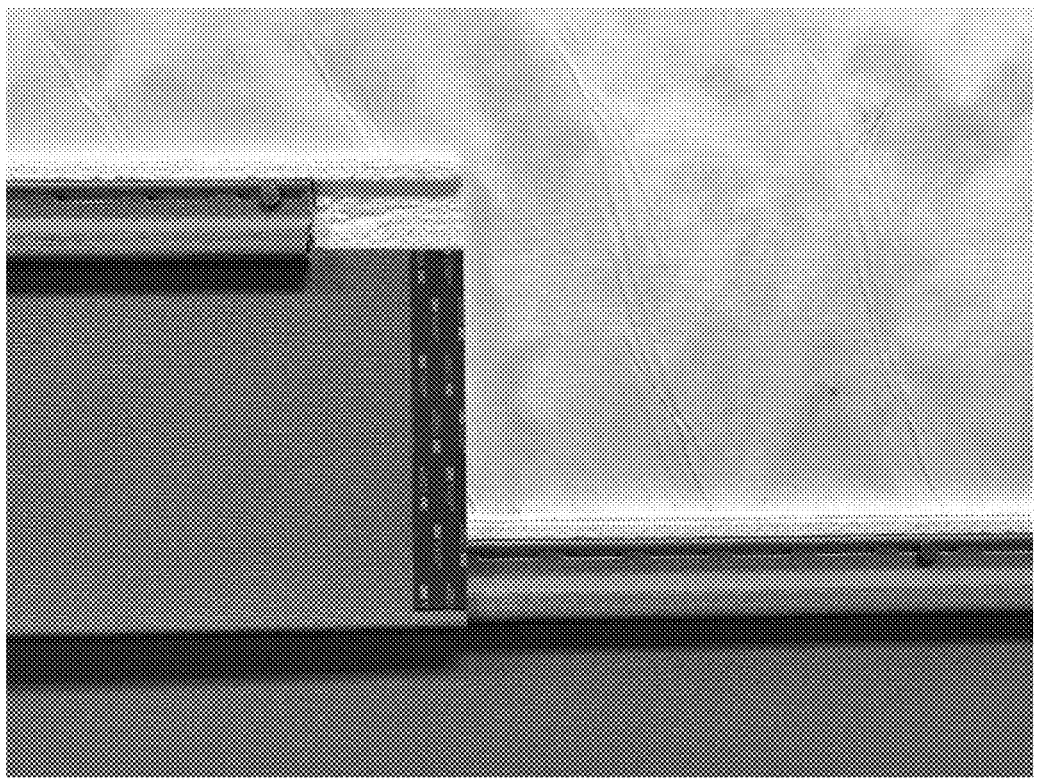
FIGS. 18A-18E are a set of pictures showing an experiment using an acrylic adhesive in the overhanging section between two siding panels.
Figure 18B:
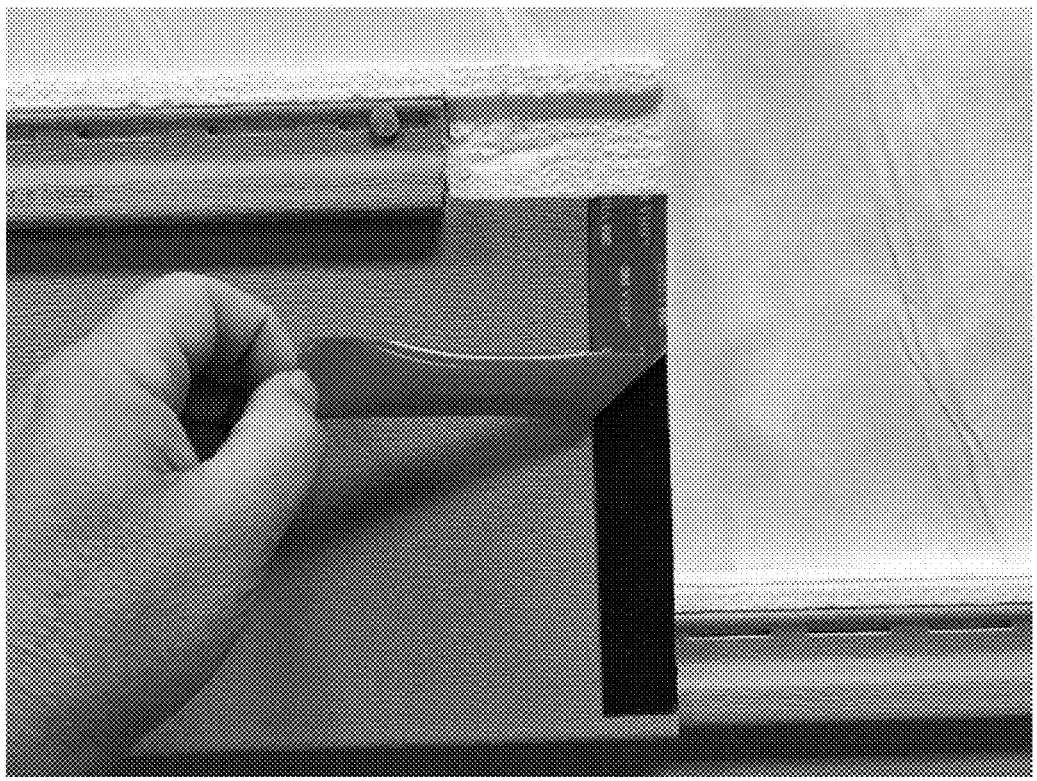
Figure 18C:
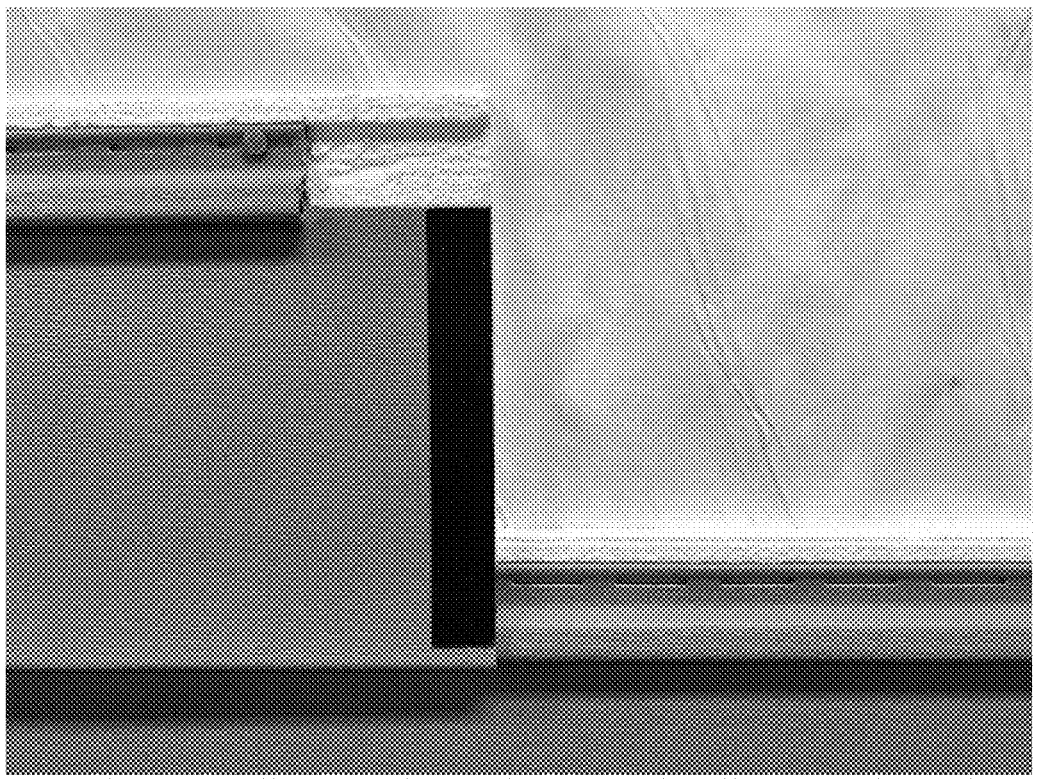
Figure 18D:
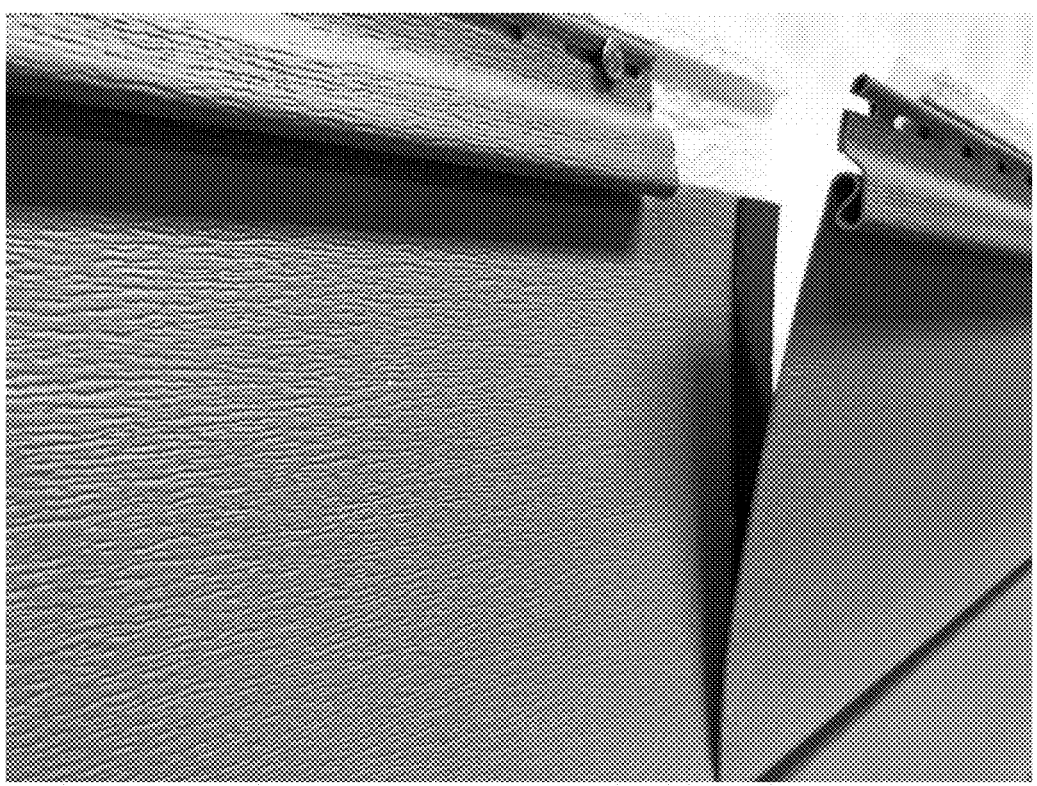
Figure 18E:
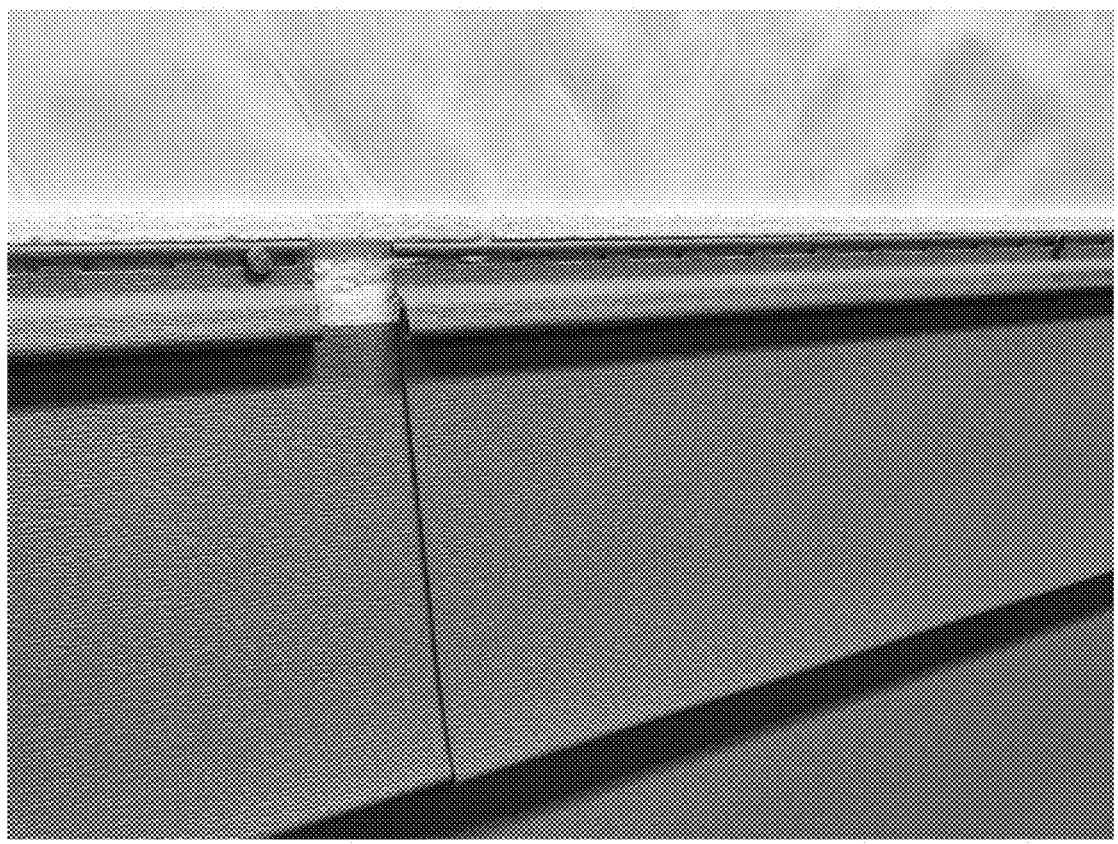

Acrylic adhesive (in the form of a tape) was applied to the overhang/interface of two vinyl siding members. In FIG. 18A, the acrylic adhesive is visible as a double-sided tape with a release liner still applied. In FIG. 18B, the release liner is being peeled off. In FIG. 18C, the acrylic adhesive/tape is visible. In FIG. 18D, the second siding panel is being applied upon the acrylic adhesive/tape. In FIG. 18E, the two siding panels are joined together to form a seam. The acrylic adhesive/tape is not visible.

Heat was then applied to the seam, and the failure temperature was measured. Failure was indicated by warping. These were compared to (A) a normal seam with no adhesive and (B) a seam that used glue. The results are seen in the following table. Briefly, the use of acrylic adhesive (tape) worked better than no adhesive or the glue.

| Seam lap | Failure temperature (° F.) | Notes |
| --- | --- | --- |
| Normal | 183 | Seam puckered inward |
| Normal | 183 | Seam puckered inward |
| Normal | 185 | Seam puckered inward |
| Taped | 199 | Seam had very little inward pucker |
| Taped | 200 | Seam had very little inward pucker |
| Taped | 204 | Seam had very little inward pucker |
| Glued | 203 | Seam was not as noticeable as other tests |
| Glued | 201 | |
| Glued | 198 | |

Figure 19A:
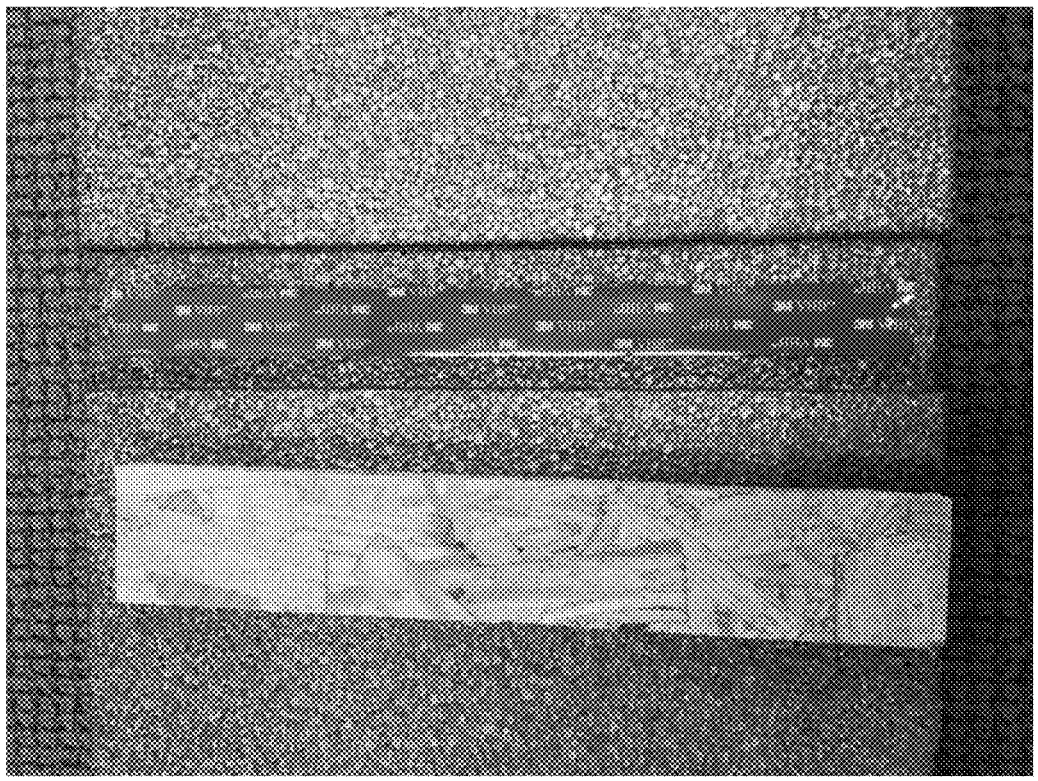
FIGS. 19A-19C are a set of pictures showing an experiment using an acrylic adhesive to join wood to foam.
Figure 19B:
Figure 19C:

FIGS. 19A-19C are a set of pictures showing an experiment using an acrylic adhesive to join wood to foam. FIG. 19A shows the piece of wood on the left, and the foam with an acrylic adhesive strip in the form of a double-sided tape with a release liner still applied. FIG. 19B shows the release liner fully removed from the acrylic adhesive strip. FIG. 19C shows the wood adhered to the foam via the acrylic adhesive.

Figure 20A:
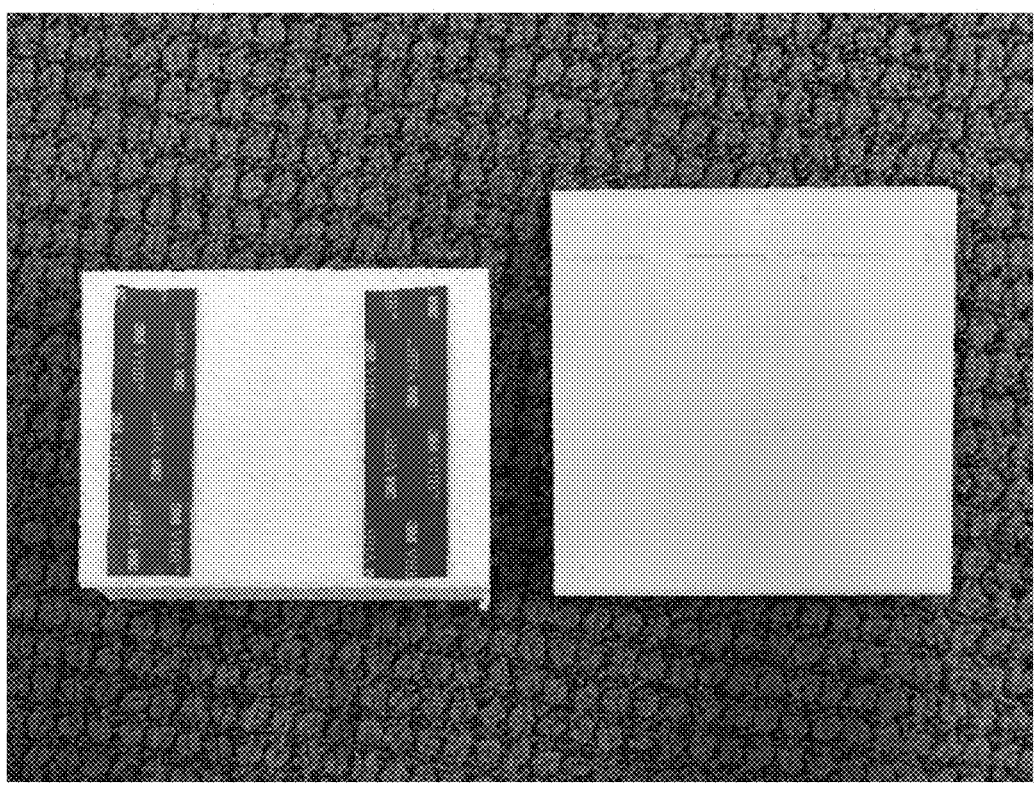
FIGS. 20A-20D are a set of pictures showing an experiment using an acrylic adhesive to join fiber cement to foam.
Figure 20B:
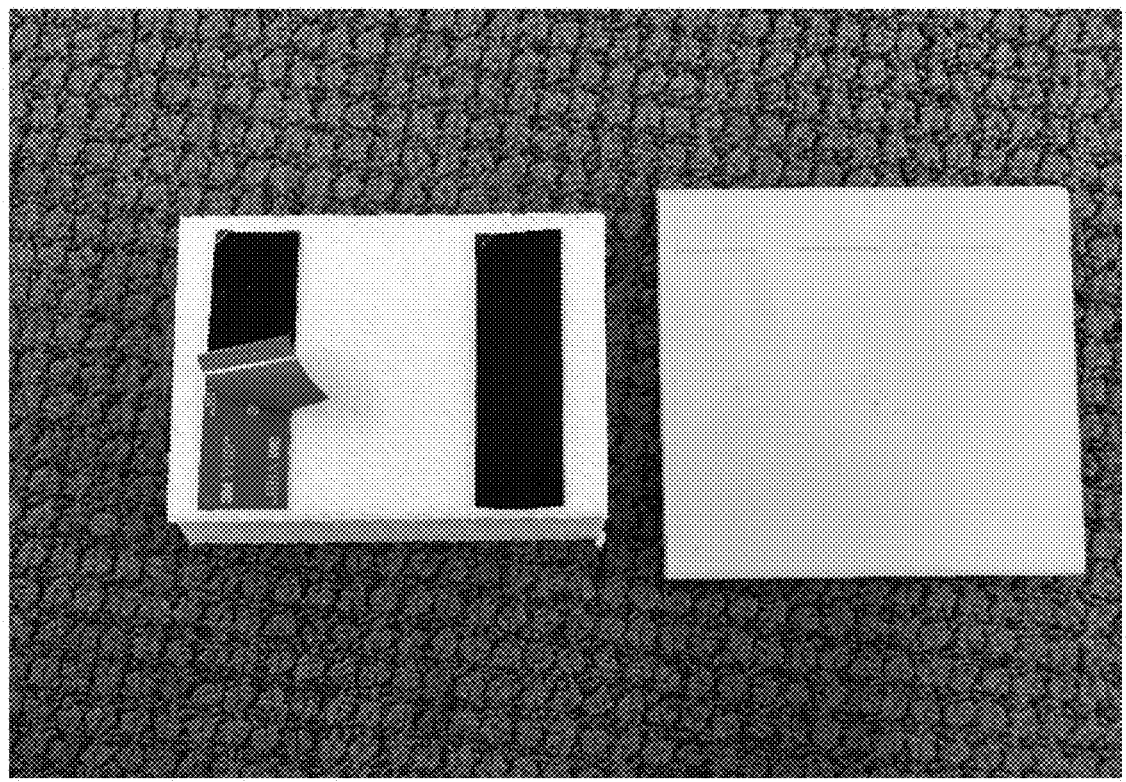
Figure 20C:
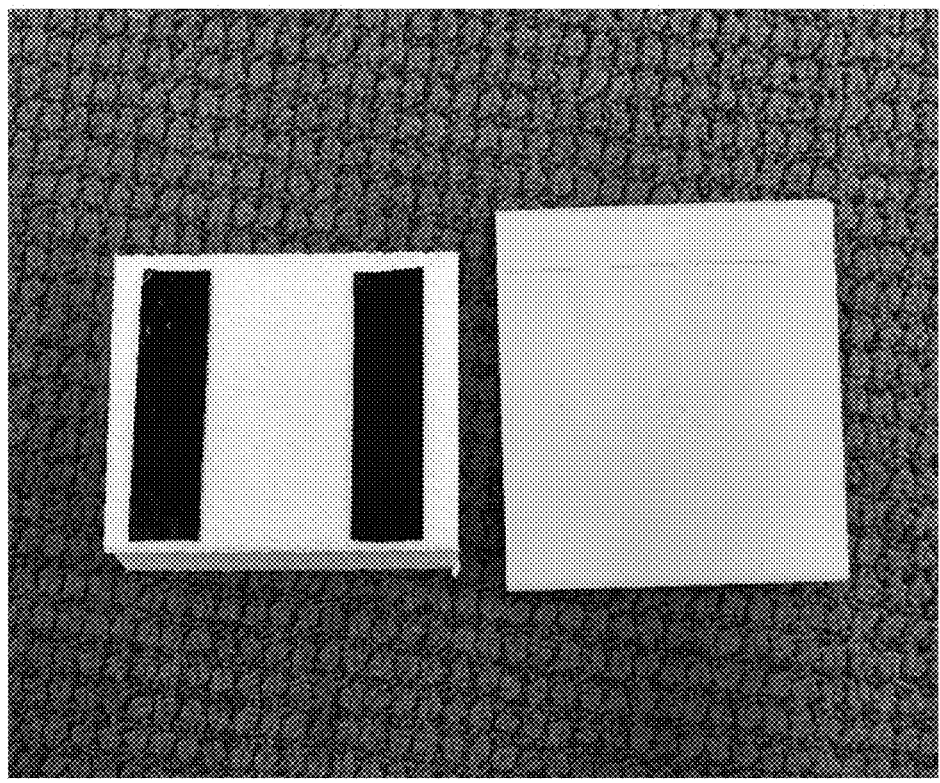
Figure 20D:
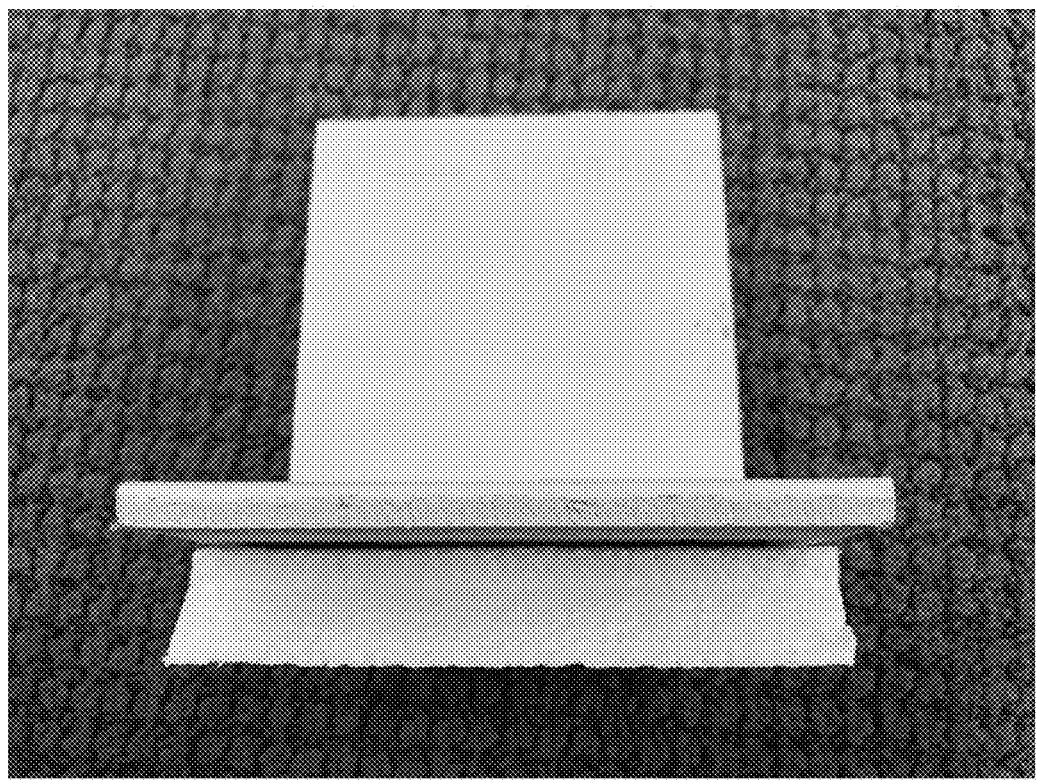

FIGS. 20A-20D are a set of pictures showing an experiment using an acrylic adhesive to join fiber cement to foam. FIG. 20A shows the fiber cement on the right and the foam on the left with two strips of acrylic adhesive in the form of a double-sided tape with a release liner still applied. FIG. 20B shows the release liner fully removed from one strip and in the process of being removed from the second strip. FIG. 20C shows the two strips of acrylic adhesive. FIG. 20D shows the fiber cement adhered to the foam via the acrylic adhesive.

Example 2

Environmental chamber tests were conducted according to ASTM D3679 to compare the expansion of (A) a naked vinyl siding panel against (B) a composite siding panel having a foam backing member attached to a vinyl siding member, with adhesive running substantially between the side edges and the top/bottom edges.

The environment chamber tests were conducted by reducing the temperature to −20° F. over two hours, then holding at −20° F. for two hours. The temperature was then increased to +160° F. over two hours, then held at +160° F. for 2 hours. The change in length of the siding panel was measured between these two temperatures.

The naked vinyl siding panel expanded one-half inch (½ inch) over a 16-foot length. In contrast, the composite siding panel only expanded one-half inch (½ inch) over a 30-foot length. This is a roughly 50% reduction in expansion (a lower degree of expansion is preferable).

Tests were also performed with two composite siding panels (B). When adhesive was applied to the overhanging portion of the vinyl siding members (to bond the overlap), the degree of expansion was not changed. The panels still only expanded one-half inch over a 30-foot length.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A composite siding panel, comprising:
a backing member having a front face, a rear face opposite the front face thereof, and longitudinally extending first and second side edges;
a siding member having a front face, a rear face opposite the front face thereof, and longitudinally-extending first and second side edges; and
an adhesive coating that joins the rear face of the siding member to the front face of the backing member, wherein the adhesive coating runs substantially from the first side edge of the backing member to the second side edge of the backing member;
wherein the first side edge of the siding member extends outwardly beyond the first front side edge of the backing member to create a first overhang, and the second side edge of the siding member extends outwardly beyond the second front side edge of the backing member to create a second overhang.

2. The composite siding panel of claim 1, further comprising indicia on a rear face of the first and second overhangs for indicating where each overhang can be cut.

3. The composite siding panel of claim 1, wherein the siding member overhangs the backing member by at least ⅜ inch on each side.

4. The composite siding panel of claim 1, wherein the siding member includes a nailing hem located proximate a top end thereof, the nailing hem having a plurality of apertures therein.

5. The composite siding panel of claim 4, wherein the nailing hem is set back from both the first side edge and the second side edge of the siding member.

6. The composite siding panel of claim 1, wherein the adhesive coating extends from a top edge of the backing member to a bottom edge thereof.

7. The composite siding panel of claim 1, wherein the adhesive coating is discontinuous and is in the form of one or more beads, ribbons, dots, or swirls.

8. The composite siding panel of claim 1, wherein the adhesive coating extends substantially from the first side edge to the second side edge of the backing member and from a top edge of the siding member to a bottom edge of the backing member.

9. The composite siding panel of claim 1, wherein the rear face of the backing member is substantially planar, and wherein the backing member further includes longitudinally-extending first and second side faces that are substantially planar and substantially parallel to each other.

10. The composite siding panel of claim 1, wherein the backing member is made of an expanded foam.

11. The composite siding panel of claim 1, wherein the siding member is formed from vinyl, polypropylene, aluminum, steel, fiberglass, engineered wood, or fiber cement.

12. The composite siding panel of claim 1, wherein the backing member has one or more contours defined therein and the siding member has one or more complementary-shaped contours defined therein.

13. The composite siding panel of claim 1, wherein a top end of the backing member extends upwardly beyond a top end of the siding member.

14. The composite siding panel of claim 1, wherein the backing member includes a laterally-extending relief channel defined in the rear face thereof and located proximate a bottom end thereof, the relief channel running from the first side edge to the second side edge of the backing member, and the relief channel is shaped to fit a top end of the backing member.

15. The composite siding panel of claim 1, wherein the siding member includes a locking flange located proximate a top end thereof and a locking lip located proximate a bottom end thereof, wherein the locking flange is complementary in shape to the locking lip.

16. The composite siding panel of claim 1, further comprising an adhesive layer on a rear surface of the first or second overhang.

17. A siding system kit, comprising:
a composite siding panel that comprises:
   a backing member having a front face, a rear face opposite the front face thereof, and longitudinally extending first and second side edges;
   a siding member having a front face, a rear face opposite the front face thereof, and longitudinally-extending first and second side edges; and
   an adhesive coating that joins the rear face of the siding member to the front face of the backing member, wherein the adhesive coating runs substantially from from the first side edge of the backing member to the second side edge of the backing member;
wherein the first side edge of the siding member extends outwardly beyond the first front side edge of the backing member to create a first overhang, and the second side edge of the siding member extends outwardly beyond the first front side edge of the backing member to create a second overhang; and
a double-sided tape comprising:
   a foam core with two opposing surfaces; and
   an adhesive layer on each of the two opposing surfaces.

18. The siding system kit of claim 17, wherein the siding member overhangs the backing member by at least ⅜ inch on each side.

19. A method of installing a composite siding panel, comprising:
receiving a composite siding panel that comprises:
   a backing member having a front face, a rear face opposite the front face thereof, and longitudinally extending first and second side edges;
   a siding member having a front face, a rear face opposite the front face thereof, and longitudinally-extending first and second side edges; and
   an adhesive coating that joins the rear face of the siding member to the front face of the backing member, wherein the adhesive coating runs substantially from the first side edge of the backing member to the second side edge of the backing member;
   wherein the first side edge of the siding member extends outwardly beyond the first front side edge of the backing member to create a first overhang, and the second side edge of the siding member extends outwardly beyond the first front side edge of the backing member to create a second overhang;
cutting off either the first overhang or the second overhang to obtain a uni-directional composite siding panel; and
installing the uni-directional composite siding panel.

20. The method of claim 19, further comprising taping the remaining overhang down.

* * * * *

UNITED STATES PATENT AND TRADEMARK OFFICE
CERTIFICATE OF CORRECTION

PATENT NO. : 10,612,245 B2
APPLICATION NO. : 15/874034
DATED : April 7, 2020
INVENTOR(S) : Patrick M. Culpepper and Ryan Beach It is certified that error appears in the above-identified patent and that said Letters Patent is hereby corrected as shown below:

In the Claims

Column 18, Line 53 Claim 1, -and second side edges- should read --and second front side edges--.

Column 20, Line 18 Claim 17, -beyond the first front side edge- should read --beyond the second front side edge--.

Column 20, Line 46 Claim 19, -beyond the first front side edge- should read --beyond the second front side edge--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*